US012116780B2

(12) United States Patent
Knudsen

(10) Patent No.: US 12,116,780 B2
(45) Date of Patent: Oct. 15, 2024

(54) POST SLEEVE ASSEMBLY

(71) Applicant: N. Eric Knudsen, Maple Valley, WA (US)

(72) Inventor: N. Eric Knudsen, Maple Valley, WA (US)

( * ) Notice: Subject to any disclaimer, the term of this patent is extended or adjusted under 35 U.S.C. 154(b) by 878 days.

(21) Appl. No.: 16/994,275

(22) Filed: Aug. 14, 2020

(65) Prior Publication Data

US 2021/0207376 A1 Jul. 8, 2021

Related U.S. Application Data

(63) Continuation of application No. 12/727,063, filed on Mar. 18, 2010, now abandoned.

(60) Provisional application No. 61/161,327, filed on Mar. 18, 2009.

(51) Int. Cl.

| | |
|---|---|
| ***E04C 3/00*** | (2006.01) |
| ***B28B 7/30*** | (2006.01) |
| ***E01F 9/623*** | (2016.01) |
| ***E01F 9/627*** | (2016.01) |
| ***E02D 5/22*** | (2006.01) |
| ***E02D 5/26*** | (2006.01) |
| ***E02D 27/42*** | (2006.01) |
| ***E04H 12/22*** | (2006.01) |
| *G09F 7/18* | (2006.01) |

(52) U.S. Cl.

CPC ................ *E04C 3/00* (2013.01); *B28B 7/306* (2013.01); *E01F 9/623* (2016.02); *E01F 9/629* (2016.02); *E02D 5/226* (2013.01); *E02D 5/26* (2013.01); *E02D 27/42* (2013.01); *E04H 12/22* (2013.01); *E04H 12/2269* (2013.01); *G09F 2007/1804* (2013.01)

(58) Field of Classification Search

CPC . E04C 3/00; E01F 9/623; E02D 5/226; E04H 12/22; G09F 2007/1804

See application file for complete search history.

(56) References Cited

U.S. PATENT DOCUMENTS

| | | | |
|---|---|---|---|
| 978,505 | A | 12/1910 | Stewart |
| 1,224,926 | A | 5/1917 | Hindmarsh |
| 1,906,706 | A | 5/1933 | Moore |

(Continued)

FOREIGN PATENT DOCUMENTS

| | | | |
|---|---|---|---|
| AT | 402310 | B | 4/1997 |
| EP | 0 153 545 | A1 | 9/1985 |

(Continued)

*Primary Examiner* — Vernal U Brown

(74) *Attorney, Agent, or Firm* — Seed IP Law Group LLP

(57) ABSTRACT

A post sleeve provides a substantially permanent base for supporting a post for a fence or sign, and from which one post can be removed and replaced with another post. The sleeve includes a concrete body that is poured on site, using a sleeve core prepositioned in the post hole, and around which wet concrete is poured. After the concrete is cured, the core is removed, leaving a post sleeve cavity configured to receive a post. The core can be rigid, or can include a flexible shell and stiffener. A preformed post sleeve top can be attached to the sleeve core and positioned therewith in the post hole, to become a permanent part of the post sleeve, once the concrete cures. A drain is attached to the core, and remains in the sleeve when the core is removed, and can be a percolation chamber, or passage extending below the sleeve.

9 Claims, 25 Drawing Sheets

(56) References Cited

U.S. PATENT DOCUMENTS

| | | | |
|---|---|---|---|
| 2,028,680 | A | 1/1936 | Mayeda et al. |
| 2,684,518 | A | 7/1954 | Whitlock |
| 2,712,467 | A | 7/1955 | Rice |
| 3,192,292 | A | 6/1965 | Banks |
| 3,265,349 | A | 8/1966 | Hamrick |
| 3,346,230 | A | 10/1967 | Tolf, Jr. |
| 3,638,433 | A | 2/1972 | Sherard |
| 3,638,741 | A | 2/1972 | Zizak |
| 3,824,748 | A | 7/1974 | Pichowicz |
| 3,837,127 | A | 9/1974 | McMichael et al. |
| 3,876,970 | A | 4/1975 | Schweitzer |
| 3,894,589 | A | 7/1975 | Ciraud |
| 4,077,599 | A | 3/1978 | Oland |
| 4,079,912 | A | 3/1978 | Haydock |
| 4,133,154 | A | 1/1979 | Ruzicka |
| 4,479,342 | A | 10/1984 | Eberle |
| 4,515,271 | A | 5/1985 | Auciello |
| 4,634,316 | A | 1/1987 | Cernak et al. |
| 4,688,969 | A | 8/1987 | Bruser et al. |
| 4,726,451 | A | 2/1988 | Giorgetti |
| 4,726,561 | A | 2/1988 | Worzala, Jr. |
| 4,773,195 | A | 9/1988 | Waller |
| 4,787,601 | A | 11/1988 | Rybak |
| 4,850,440 | A | 7/1989 | Smet |
| 4,874,149 | A | 10/1989 | Miceli |
| 4,926,785 | A | 5/1990 | Lamson |
| 4,986,373 | A | 1/1991 | Charland et al. |
| 5,040,251 | A | 8/1991 | Hanford |
| 5,090,165 | A | 2/1992 | Kenny |
| 5,090,656 | A | 2/1992 | Brown |
| 5,156,755 | A | 10/1992 | Cass |
| 5,165,663 | A | 11/1992 | Wells |
| 5,315,796 | A | 5/1994 | Gruhlke |
| 5,339,909 | A | 8/1994 | Jenne et al. |
| 5,405,119 | A | 4/1995 | Maguire |
| 5,491,905 | A | 2/1996 | Jablonski et al. |
| 5,492,429 | A | 2/1996 | Hodges |
| 5,542,481 | A | 8/1996 | Scott |
| 5,597,505 | A | 1/1997 | Koenig et al. |
| 5,632,464 | A | 5/1997 | Aberle |
| 5,752,349 | A | 5/1998 | Fitzsimmons et al. |
| 5,913,778 | A | 6/1999 | Hying et al. |
| 5,961,249 | A | 10/1999 | Hansen et al. |
| 5,992,103 | A | 11/1999 | Norman et al. |
| 6,041,559 | A | 3/2000 | Schickert et al. |
| 6,073,416 | A | 6/2000 | Peter |
| 6,098,351 | A | 8/2000 | Mills |
| 6,098,353 | A | 8/2000 | Stanfield |
| 6,267,688 | B1 | 7/2001 | Morelli, Sr. |
| 6,273,657 | B1 | 8/2001 | Vorona |
| 6,293,028 | B1 | 9/2001 | Sylvia |
| 6,308,926 | B1 | 10/2001 | Meyer |
| 6,345,474 | B1 | 2/2002 | Triplett |
| 6,389,760 | B1 | 5/2002 | McDonnell |
| 6,621,417 | B2 | 9/2003 | Duncan et al. |
| 6,658,753 | B2 | 12/2003 | Tatarnic |
| 6,860,029 | B2 | 3/2005 | Haynes |
| 6,886,296 | B1 | 5/2005 | John et al. |
| 6,991,413 | B2 | 1/2006 | Ballou et al. |
| 7,003,919 | B2 | 2/2006 | Riker |
| 7,055,807 | B2 | 6/2006 | Pesta |
| 7,134,636 | B2 | 11/2006 | Callies |
| 7,185,461 | B2 | 3/2007 | Lapointe et al. |
| 7,185,720 | B1 | 3/2007 | Menna |
| 7,191,573 | B1 | 3/2007 | Newton, II |
| 7,219,872 | B2 | 5/2007 | Walker |
| 7,325,790 | B2 | 2/2008 | Lee |
| 7,377,489 | B1 | 5/2008 | Houseman |
| 7,484,311 | B2 | 2/2009 | Bommarito |
| 7,621,098 | B2 | 11/2009 | Reinert, Sr. |
| 7,689,384 | B1 | 3/2010 | Becker |
| 7,726,037 | B1 | 6/2010 | Jordan |
| 7,861,434 | B2 | 1/2011 | Knudsen |
| 7,954,289 | B2 | 6/2011 | Evans |
| 7,966,740 | B2 | 6/2011 | Knudsen |
| 8,011,149 | B2 | 9/2011 | Knudsen |
| 8,109,006 | B2 | 2/2012 | Knudsen |
| 8,820,007 | B2 * | 9/2014 | Knudsen ............. E04H 12/2215 52/165 |
| 2001/0000548 | A1 | 5/2001 | Niehaus |
| 2002/0007613 | A1 | 1/2002 | Gordin et al. |
| 2002/0135090 | A1 | 9/2002 | Koren |
| 2002/0139069 | A1 | 10/2002 | Buffkin et al. |
| 2003/0121223 | A1 | 7/2003 | Riker |
| 2004/0134146 | A1 | 7/2004 | Brown |
| 2004/0255481 | A1 | 12/2004 | Haynes |
| 2005/0005468 | A1 | 1/2005 | Wixey |
| 2005/0241263 | A1 | 11/2005 | Van Rijn |
| 2006/0243808 | A1 * | 11/2006 | Burlando ......... G06K 19/06046 235/487 |
| 2007/0036938 | A1 | 2/2007 | Engelbrecht |
| 2007/0119067 | A1 | 5/2007 | Mackey |
| 2007/0246697 | A1 * | 10/2007 | Stalder ................... A01K 3/005 256/32 |
| 2007/0267552 | A1 * | 11/2007 | Meyer ................. E04H 12/2276 248/156 |
| 2009/0025332 | A1 | 1/2009 | Richards |
| 2009/0090836 | A1 | 4/2009 | Harris |
| 2009/0119941 | A1 | 5/2009 | Sentz |
| 2010/0154324 | A1 | 6/2010 | Mason et al. |
| 2010/0229415 | A1 | 9/2010 | Knudsen |
| 2011/0161054 | A1 | 6/2011 | Woolf et al. |
| 2011/0320182 | A1 | 12/2011 | Dommisse et al. |

FOREIGN PATENT DOCUMENTS

| | | | |
|---|---|---|---|
| KR | 10-0991886 | B1 | 11/2010 |
| WO | 2007/064235 | A1 | 6/2007 |
| WO | 2008/047151 | A1 | 4/2008 |

* cited by examiner

POST SLEEVE ASSEMBLY

BACKGROUND

Technical Field

The embodiments of the present disclosure are related in general to the field of installation of supports for uprights of fences, traffic signs, real estate signage, etc., and in particular to post supports that can be permanently installed, and from which one post can be removed and another emplaced.

Description of the Related Art

A post is a substantially straight, elongated columnar structure that is anchored at one end so as to stand upright, and that supports thereon another structure. A post can be made of any appropriate material, including wood, metal, or plastic. Posts of various lengths and compositions are used in a wide range of applications, including supporting fences, traffic control signs, temporary structures, etc. Where a post is intended to be substantially permanent, it is often placed in a hole and anchored in a concrete footing to increase its cross section and hold it firmly in place. One problem that is commonly encountered in such situations is that posts, especially wooden posts, are subject to breakage, warpage, and decomposition. Replacing a post that has been anchored in concrete is difficult, wasteful, and unfriendly to the environment for reasons that include excessive use of natural resources and the generation of landfill material. The concrete footing must be removed from the ground in order to make room for the new post. This requires that a much larger hole must be dug around the concrete footing. In turn, this requires a much larger volume of concrete or re-compaction of the surrounding soil, to fill the hole around the new post and create the new footing in proper contact with undisturbed or adequately compacted soil.

One of the most common causes of deterioration in wooden posts is water trapped around the end of the post inside the concrete. For example, when the post is damp or wet for an extended period of time, the wood absorbs water and draws it by capillary action downward into the concrete footing. Water becomes trapped between the wood and the inside wall of the concrete, so that the end of the post remains wet even while the upper portion is dry. This is especially true in cases where the end of the post is completely encapsulated in concrete, preventing water from escaping through the bottom of the footing, in which case the majority of the water escapes only through the wicking action of the end grain of the post.

To reduce this problem, installers often pour several inches of gravel into the bottom of a post hole and place the post directly on the gravel before they pour concrete around it. This prevents the concrete from completely sealing up the bottom of the post by flowing under it, and thus provides a channel for water to escape into the gravel. However, this is only a partial solution. Often the drainage gravel is not fully compacted and settles, causing more need for repair and replacement. Furthermore, with this common method, it takes substantial time for water, once having entered the footing, to work its way all the way through the footing and out the bottom. If the post is subjected to frequent or extended wet periods, the end of the post inside the footing may remain constantly wet even though water continues to drain out the bottom. Additionally, because of the direct contact with the ground on the end of the post, water can move upward into the footing when the ground is wet, due to the capillary or wicking effect of the end grain. This constant dampness encourages the growth of organisms that digest the wood fiber and eventually destroy the post, or in the case of steel, rusts the post away. Additionally, the bottom of the footing is substantially open to insects, which can enter unobstructed from the gravel below to attack and eat the post.

Furthermore, direct contact between concrete and some species of wood generates a reaction that promotes deterioration of the wood. This limits the species of wood that can be used for fence or sign posts where concrete footings will be used in direct contact with the post.

Another approach that is used to protect wood posts and other lumber in direct contact with the ground or with concrete is commonly referred to as pressure treating. In this process, protective chemicals are forced into an outer surface of the post under high pressure. The chemicals provide the post with protection from common funguses and other organisms that cause deterioration. Pressure treatment generally extends the useful life of a post by a factor of five to ten. However, the chemicals used in pressure treatment are often toxic to humans and non-target organisms, and can leach into the water supply. In other cases, the chemicals are highly corrosive, tending to cause corrosion in fasteners and structures that are attached thereto. An additional problem with pressure treatment is that the wood cannot generally be recycled when it is replaced, and should not be composted, because of the chemicals still present. This means that it must be deposited in a landfill which in turn is a result of the need to install a post in direct contact with the ground and or concrete.

A third approach to this problem is the use of prefabricated anchors or sleeves, i.e., pockets that are placed in the ground or anchored in a concrete footing. These anchors permit a post to be removed and replaced without requiring that the pocket itself be replaced. Some examples of such anchors are disclosed in the following U.S. patents, all of which are incorporated herein by reference in their entireties: U.S. Pat. Nos. 5,632,464; 6,098,353; and 7,325,790.

BRIEF SUMMARY

According to an embodiment, a post sleeve includes a concrete body that is poured on site, using a sleeve core that is prepositioned in the post hole, and around which wet concrete is poured. After the concrete is cured, the core is removed, leaving a post sleeve cavity configured to receive a post. The sleeve core includes features for forming selected features of the post sleeve. According to an embodiment, a drainage chamber is attached to the bottom of the sleeve core, and remains in the concrete when the core is removed. the chamber can be configured to drain by percolation, or can be placed in fluid communication with the soil surrounding the post hole.

According to one embodiment, the sleeve core comprises a flexible shell, made of an elastomeric material, for example, and a stiffener configured to hold the shell to its proper shape while the concrete cures.

According to another embodiment, the sleeve core is rigid. It can be provided with a pattern draft, or a release agent is applied to a thickness sufficient to permit removal of the core, without a pattern draft.

According to an embodiment, a preformed sleeve top is provided, and configured to be coupled to the sleeve core prior to placement in the post hole. The wet concrete firmly engages the sleeve top, which remains as part of the finished post sleeve once the sleeve core is removed.

According to an embodiment, half sleeves are provided, which are configured to be bonded together in a face-to-face position, to form a complete post sleeve.

THE SEVERAL VIEWS OF THE DRAWINGS

DETAILED DESCRIPTION

Figure 1:
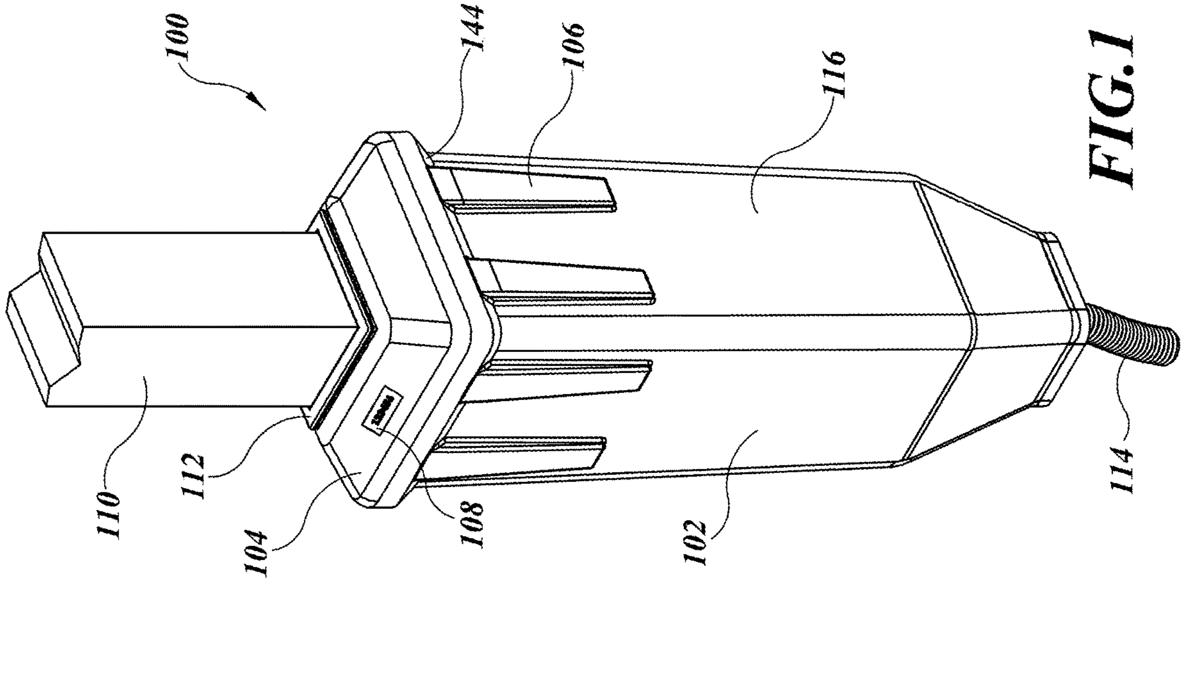
FIG. 1 is a perspective view of a post sleeve assembly according to an embodiment of the invention.

FIG. 1 shows a post sleeve assembly 100 according to a first embodiment. The post sleeve assembly 100 includes a post sleeve 102 having a body 116 with a somewhat tapered shape and a wide rim 104 extending outward from the body in each direction. Reinforcing ribs 106 extend from the body 116 to the underside or soffit 144 of the rim 104. A post 110 is shown positioned in the post sleeve 102. An upper surface of the rim 104 slopes downward, away from the post on all sides. An identification plate 108 is inset into an upper surface of the rim 104. A post collar 112 fits closely around the post and extends partway into an upper aperture 121 (see FIG. 2) of the post sleeve 102 providing a means to block insects, debris, and direct rain from infiltrating while maintaining substantial airflow to the post sleeve assembly and giving lateral support to the post from the supporting post sleeve 102.

The rim 104 is shown as having a smooth regular surface. According to other embodiments, the rim 104 can have any of a variety of shapes and configurations. For example, it can be embossed or debossed with text or symbols, textured to resemble stone or brick, or provided with architectural detail to coordinate with other nearby elements. The material of the body can be colored to add architectural detail, to promote functionality, or provide decorative appeal. The identification plate 108 is provided with a unique identifier that may be applied during fabrication, and serves to separately identify each post sleeve assembly 100.

Figure 2:
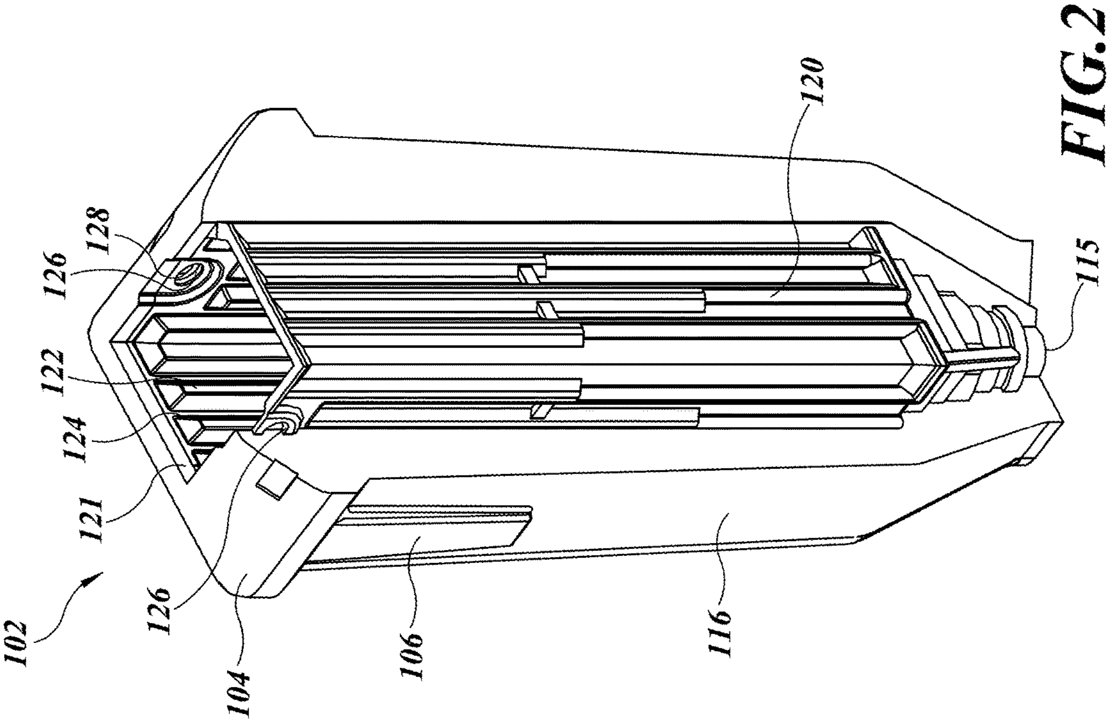
FIG. 2 shows a partial cutaway view of the post sleeve of the assembly of FIG. 1, showing a sleeve liner.

Turning now to FIG. 2, the post sleeve 102 is shown with a portion of the body 116 cut away to show details of the interior. A sleeve liner 120 is positioned within the body 116 and is substantially encapsulated therein. The sleeve liner defines a cavity 111 extending the length of the post sleeve, and configured to receive a post. The cavity 111 has an upper aperture 121 that is configured to receive a post, and a lower aperture 115 configured to provide drainage. Standoff ribs 122 are provided on inner walls of the cavity 111 with spaces between the standoff ribs 122 defining drain channels 124. The sleeve liner 120 includes a liner aperture 126, and the body 116 comprises an outer sleeve aperture 128 in a position that corresponds to the liner aperture 126 so as to be contiguous therewith and provide an aperture extending from the cavity 111 to the exterior of the post sleeve.

Figure 3:
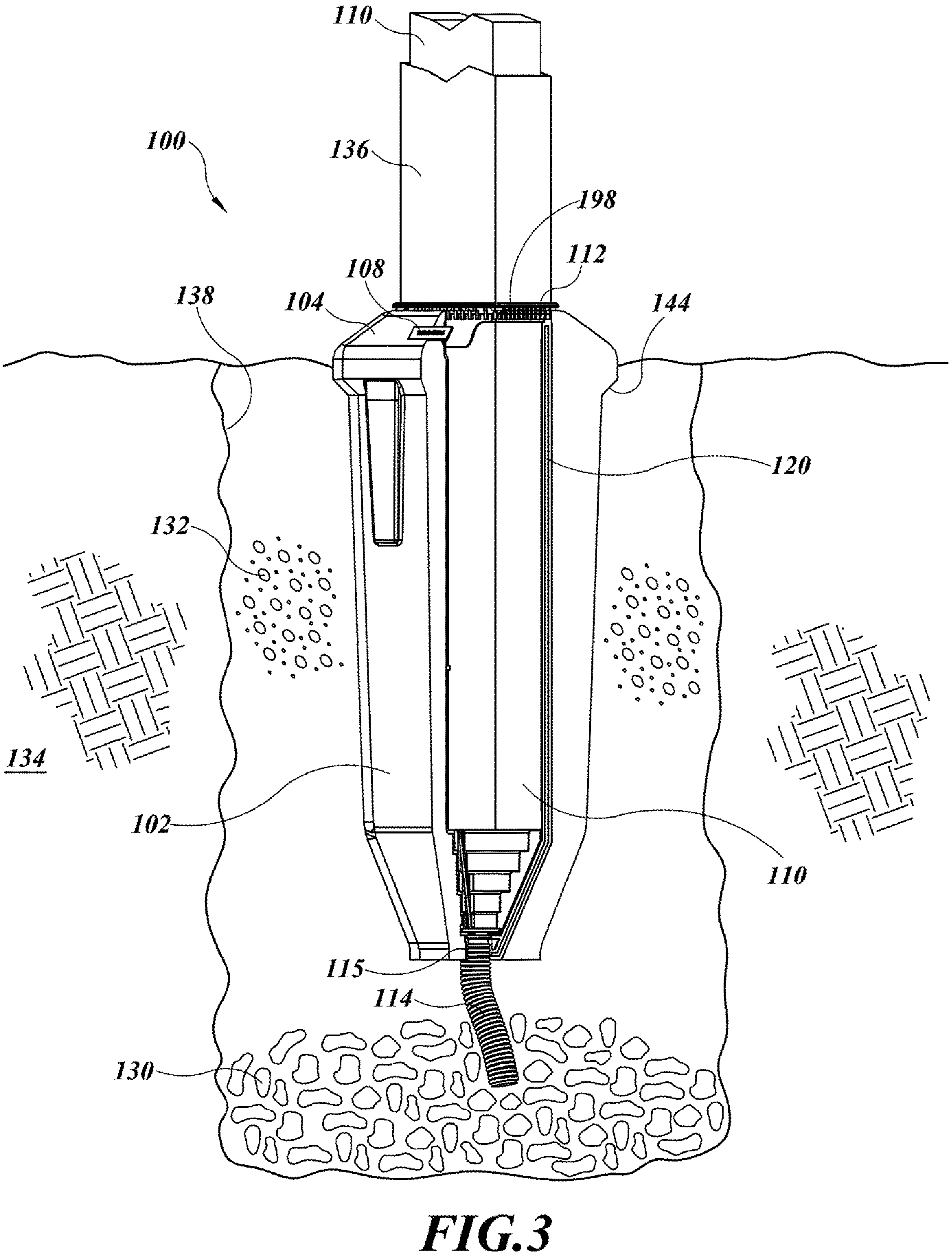
FIG. 3 shows the post sleeve assembly of FIG. 1 positioned in the ground as a finished footing.

According to the embodiment pictured, the post sleeve 102 is sized to receive a 4×4 post, of the kind that is widely used for fences and signs. When a 4×4 post is positioned in the post sleeve 102 (as shown in FIG. 3), it is supported on four sides by the standoff ribs 122, such that the post sleeve 102 functions as an extension of the post. While vertically oriented standoff ribs are shown and described, other standoff elements can be employed, such as diagonal ribs, short knobs extending within the cavity 111, etc., all of which fall within the scope of the invention.

The sleeve liner 120 is produced by injection molding, blow molding, or some other appropriate method of manufacture, and can be assembled from two or more pieces, or can be made as a single piece. The sleeve liner 120 is placed within a mold, and the body 116 of the post sleeve 102 is cast around the sleeve liner 120. The body 116 extends above the upper portion of the sleeve liner 120, which shields the plastic sleeve from long term exposure to UV rays, which can cause many plastics to deteriorate. The standoff ribs 122 contact and support the post 110 and prevent contact between the wood post and the concrete body 116, while the drain channels 124 allow water to drain away from the post and permit air ventilation to promote moisture evaporation.

In one embodiment, the body 116 is cast from a high strength concrete mix that includes glass fiber reinforcement and is formulated to have compression strength of 5,000 to 9,000 psi, or more. It is formed to be highly resistant to most environmental and incidental wear and tear that such a structure is likely to be subjected to. Accordingly, it is anticipated that the post sleeve 102 will have a serviceable life span many times that of a typical wood post footing that is poured on site, and may exceed 50 years, perhaps reaching 100 years or more.

According to alternate embodiments, the body 116 and the sleeve liner 120 can be formed from any suitable material, including recycled plastic, metal, fiberglass, composite resin etc. Alternatively, the sleeve liner can be a thin concrete shell into which the interior features of the sleeve are cast, which is then encapsulated in a concrete post sleeve or footing, as described herein The identification plate 108 is shown as a metal (e.g., brass) plate that is embedded in the body 116 during the fabrication process. Alternatively, the identification plate 108 can be mounted to the body after fabrication, or the reference number can be formed in the material of the body 116, either on the rim 104 or inside the upper aperture 121, during the casting process. In other embodiments, the post sleeve has no identification markings.

FIG. 3 shows the post sleeve assembly 100 anchored in the ground 134 with a portion of the rim 104 extending above ground level. The rim 104 is configured to provide added lateral strength to the post and to reduce or prevent infiltration of water, debris and ground cover, as well as insects. Furthermore, it serves to protect the post from gardening tools such as edgers and string trimmers. The post sleeve 102 is positioned in a hole 138 in the ground 134. A layer 130 of compacted sand or drainage gravel is positioned at the bottom of the hole for drainage, and a poured concrete footing 132 surrounds and encases the post sleeve 102 in the hole 138. The concrete footing 132 adds cross sectional area for lateral support, depth for frost line resistance, and fills the hole between the post sleeve 102 and the undisturbed ground 134. As shown in FIG. 3, the post sleeve assembly 100 includes a flexible drain hose 114 coupled at a first end to the post sleeve 102 at the lower aperture 115, a second end thereof extending into the drainage gravel 130 at the bottom of the hole 138. The gravel functions as a dry well in which drainage from the flexible drain hose 114 accumulates, and from which water infiltrates to the surrounding soil. A plastic cover 136, such as is commonly used in vinyl fencing, is shown positioned over the post 110.

The post collar 112 includes a plurality of spacing ribs 198 distributed around a bottom surface thereof, which are shaped such that a portion of each of the spacing ribs 198 rests on an upper slightly outward sloped surface of the rim 104 of the post sleeve 102, with another portion extending into the upper aperture 121 of the post sleeve 102 between an inner surface of the post sleeve 102 and the post 110. In this way, the spacing ribs 198 serve to maintain a gap between the upper surface of the rim 104 and the lower surface of the post collar 112, providing ventilation while still allowing lateral support to the post by the post collar 112. The gaps between the spacing ribs 198 permit air to enter the post sleeve to assist in evaporation of moisture within the sleeve, but the post collar 112 is shaped to generally prevent water from entering the sleeve via the gaps between the spacing ribs 198. The spacing of the spacing ribs 198 is selected to prevent most insects from entering the post sleeve, including bees, hornets, and larger termites. An upper surface of the post collar 112 is sloped to promote run-off of moisture, and the bottom edge of the outer rim includes a break edge to prevent water from traveling back into the underside of the collar by capillary action as it drips off the edge.

The heating affect of the sun on the exposed concrete rim 104 creates a heat differential within the post sleeve 102 that generates convection within the cavity 111 to increase the airflow. Water that does enter the post sleeve 102 readily drains into the drainage gravel 130 via the flexible drain hose 114. Furthermore, as noted with reference to FIG. 2, the post 110 is separated from an inner wall of the post sleeve 102 by the plurality of standoff ribs 122 that define the internal dimensions of the cavity 111. The standoff ribs 122 of the embodiment pictured are sized and positioned to contact and support the outer surface of a common 4×4 post. Drain channels 124 extending lengthwise between the ribs in the post sleeve 102, permit water to flow easily out of the post sleeve and drain via the lower aperture 115 and the flexible drain hose 114, thereby preventing water from remaining in contact with the post 110 for extended periods. Top surfaces 123 of the standoff ribs 122 are sloped, permitting smooth post insertion during installation (see also FIG. 4).

According to an embodiment, the dimensions defined by the ribs 122 are slightly greater than the dimensions of a standard 4×4 post in order to accommodate a swollen or slightly bowed post. Alternatively or additionally, the material and thickness or shape of the innermost surfaces of the standoff ribs 122 of the sleeve liner 120 are selected to permit some resiliency to accommodate slight variations in size while adequately supporting the post.

The post sleeve assembly 100 helps to limit moisture damage to posts positioned therein in a number of ways. For example, water that strikes the post 110 runs down until it encounters the post collar 112, which diverts most of the water away from the post 110 and onto the upper surface of the rim 104 of the post sleeve 102. The water then flows down the sloped surface of the rim 104 and away from the post entirely. The limited amount of water that does enter the post sleeve 102 is generally channeled away from the post 110 by the drain channels 124 of the post sleeve liner 120 and runs to the bottom of the post sleeve 102, whence it exits via the flexible drain hose 114. Additionally, air circulation enabled by the gap under the post collar 112, and enhanced by convection and the normal flow of air around the post, further reduce the amount of moisture in the post sleeve 102.

The soffit 144 extends from an outer surface of the rim 104 to the lower portion of the body 116 of the post sleeve 102 at a substantial downward angle. When the post sleeve 102 is encapsulated in the concrete footing 132, as shown in FIG. 3, the angle of the soffit 144 allows the concrete to flow smoothly around the post sleeve 102 and fill in the spaces, which reduces the likelihood that air pockets will be trapped between the freshly mixed concrete footing 132 and the outer surface of the post sleeve 102. Typical poured-in-place concrete used for anchoring posts, such as that shown in the embodiment of FIG. 3, is more porous than concrete handled in a controlled manufacturing environment, such as the material used to form the post sleeve 102. Accordingly, water can percolate through the more porous concrete footing 132 and become trapped in air pockets alongside the body 116 of the post sleeve 102. If this occurs, there is a danger of cracking of the post sleeve 102 or the concrete footing 132 in the event the water freezes. The slanted surface of the soffit 144 reduces this danger. Additionally, the outer surface of the body 116 may be pre-treated with a concrete bonding agent to accelerate and perpetuate the bond of the lower strength concrete footing 132 to the body 116.

A poured-in-place concrete footing will typically have a psi rating in the range of 2,500 to 3,500 lbs. In contrast, concrete that is handled in a controlled manufacturing environment, with proper temperature control, vibration, mixing, and admixtures, such as the high strength material used to form the post sleeve 102, can easily reach a 5,000 to 9,000 psi rating, or more, resulting in a hardened casing of extreme durability and life expectancy. The life expectancy of the relatively weaker poured-in-place concrete footing 132 is significantly increased by the post sleeve 102 because the substantially larger cross-sectional area of the post sleeve distributes and decreases the point load exerted under lateral loads by the narrower effective section of the post 110 itself.

Figure 4:
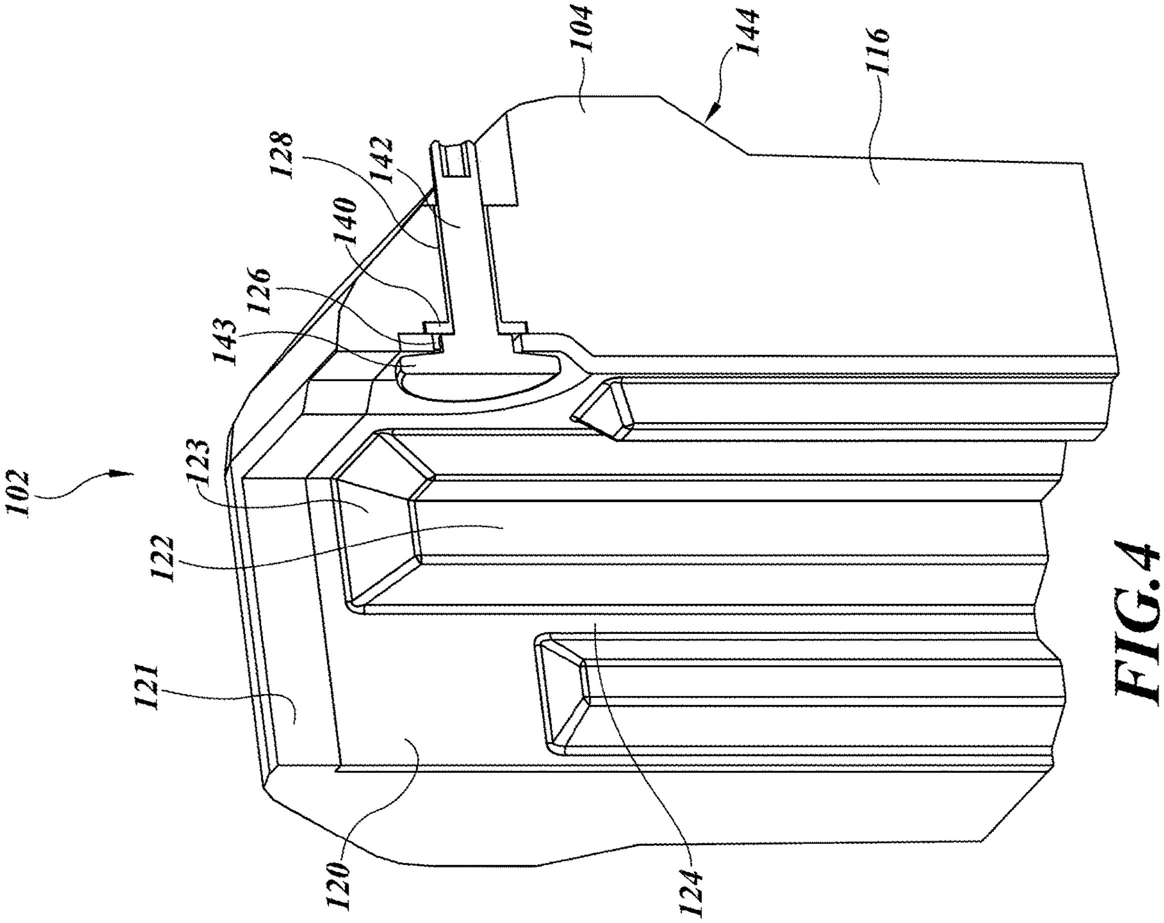

Turning now to FIG. 4, a detail of an upper portion of the post sleeve 102 and rim 104 is shown in cutaway view. FIG. 4 shows a fastener 142 extending from the interior of the post sleeve 102 to the exterior via the liner aperture 126 and the outer sleeve aperture 128. A threaded insert 140 is engaged by threads on the fastener 142. The fastener 142 extends into the interior of the post sleeve 102 and includes a pressure pad 143 on the end positioned within the post sleeve 102. When a post is positioned within the post sleeve 102, the fastener 142 is then driven in by rotation to engage a surface of the post collar 112, which transmits the pressure to the post, locking the post in the post sleeve 102. When removal of the post is necessary, one merely releases the fastener 142 and slides the post out of the post sleeve 102. In one embodiment, the threaded insert 140 is emplaced in the high strength concrete during the casting process, and is very securely attached. The material of the fastener is preferably a corrosion resistant material such as stainless steel and may be replaced as necessary when the post is removed.

According to an alternate embodiment, one or more apertures are provided from the exterior of the post sleeve 102, similar to the combined apertures 126, 128, and common fasteners, such as, for example, long deck screws, are driven into the post via the apertures, thereby securely anchoring the post to the post sleeve.

Figure 5:
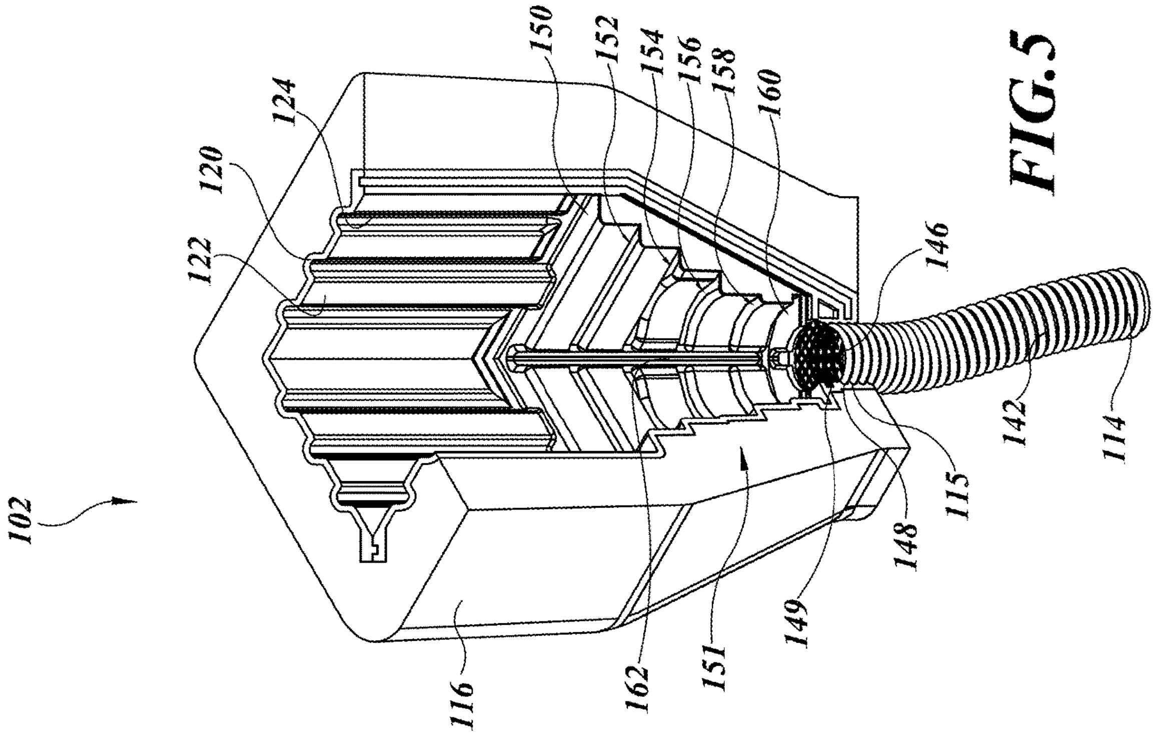
FIGS. 4 and 5 show respective details of the post sleeve assembly of FIG. 1 in cutaway view.

FIG. 5 is a cutaway view of a lower portion of the post sleeve 102, showing a universal socket section 151 comprising a plurality of sockets, including sockets configured for a number of the most common post shapes and dimensions. The sockets preferably have a slight taper in the sidewalls to allow for small variations in the dimensions of the post, including variations caused by surface treatments, swelling due to moisture, and slight manufacturing defects or tolerances in the actual dimensions of the posts. The reference characters in FIG. 5 that refer to the sockets indicate a respective step or ledge, but the socket indicated also includes sidewalls or other vertical elements to provide lateral support for a post.

Uppermost is the 4×4 socket 150, configured to receive a standard 3½×3½ inch fence post (nominally 4×4). The four sides of the 4×4 post are supported laterally by the standoff ribs 122 to hold the post snugly in place. The bottom end of the post rests on the ledge, or step, indicated by the reference number 150. A 3½ inch round post will also be accommodated in the 4×4 socket 150. Next is the 3 inch socket 152, configured to receive a standard 3 inch square post. The base of the post rests on the step indicated at reference number 152, and the four sides are supported by the side walls that extend upward from that step toward the 4×4 socket 150. The 2½ inch socket 154 is configured to receive a 2½ inch square post or a nominal 3 inch round post. The base of the post rests on the step indicated at reference number 154, and the four sides are supported by the side walls that extend upward from the step toward the 3 inch socket 152. Similarly, the (nominal) 2½ inch round socket 156, (nominal) 2 inch round socket 158, and 1% inch round socket 160 are positioned one beneath the next as shown in FIG. 5, configured to receive round posts of tubing or pipe commonly used for fence and sign posts, railing balusters, etc. Additionally, the 2½ inch round socket 156 will also accommodate a 2 inch square post by providing bearing surfaces at the corners.

The socket sizes shown are merely exemplary, and do not limit the scope of the invention. For example, according to an embodiment, the post sleeve is provided with common metric-sized sockets for use where metric-sized posts are standard. Furthermore, the post sleeve is not limited to square and round sockets, or even to the most common sizes. It may be beneficial in some applications to provide rectangular or polygonal sockets for particular applications.

In the embodiment of FIG. 5, most of the standoff ribs 122 terminate above the bearing surface of the 4×4 socket 150, providing a drainage passage 162 for water to run to a corner of the sleeve liner 120, even when a 4×4 post is positioned in the 4 inch socket. Drain gutters 161 extend down through each of the bearing surfaces and terminate above the lower aperture 115 to allow water to drain past the respective sockets and out the drain hose 114.

The flexible drain hose 114 shown in FIG. 5 comprises a plurality of annular ridges that create a flexible yet crush resistant pipe. Mating ridges 148 formed in the aperture 115 are sized to engage the ridges of the flexible drain hose 114, which is snapped into the aperture 115 to attach the flexible drain hose 114 to the sleeve liner 120. According to another embodiment, the lower aperture 115 is provided with a standard hose thread coupling. In other embodiments the lower aperture 115 may be a slip fit, press fit, snap fit, or any other loosely coupled means of providing a drainage port during the concrete pouring process for the concrete footing 132. It should be noted that a watertight seal between the flexible drain hose 114 and the lower aperture 115 is not necessary. The coupling need merely be sufficiently tight to prevent concrete from flowing into the lower aperture 115 during installation. Thus the tube can be any convenient tube, including a section of recycled garden hose, etc. The portion of the hose that will be buried in gravel can be provided with perforations to permit water to drain from the hose at various points to improve percolation. Alternatively, a length of soaker hose, such as is commonly used by gardeners to irrigate gardens, may be used in place of the flexible drain hose 114. It should be further recognized that the cross sectional area of the lower aperture 115 and accompanying flexible drain hose 114 can be as small or large as is deemed necessary for different conditions.

Figure 6:
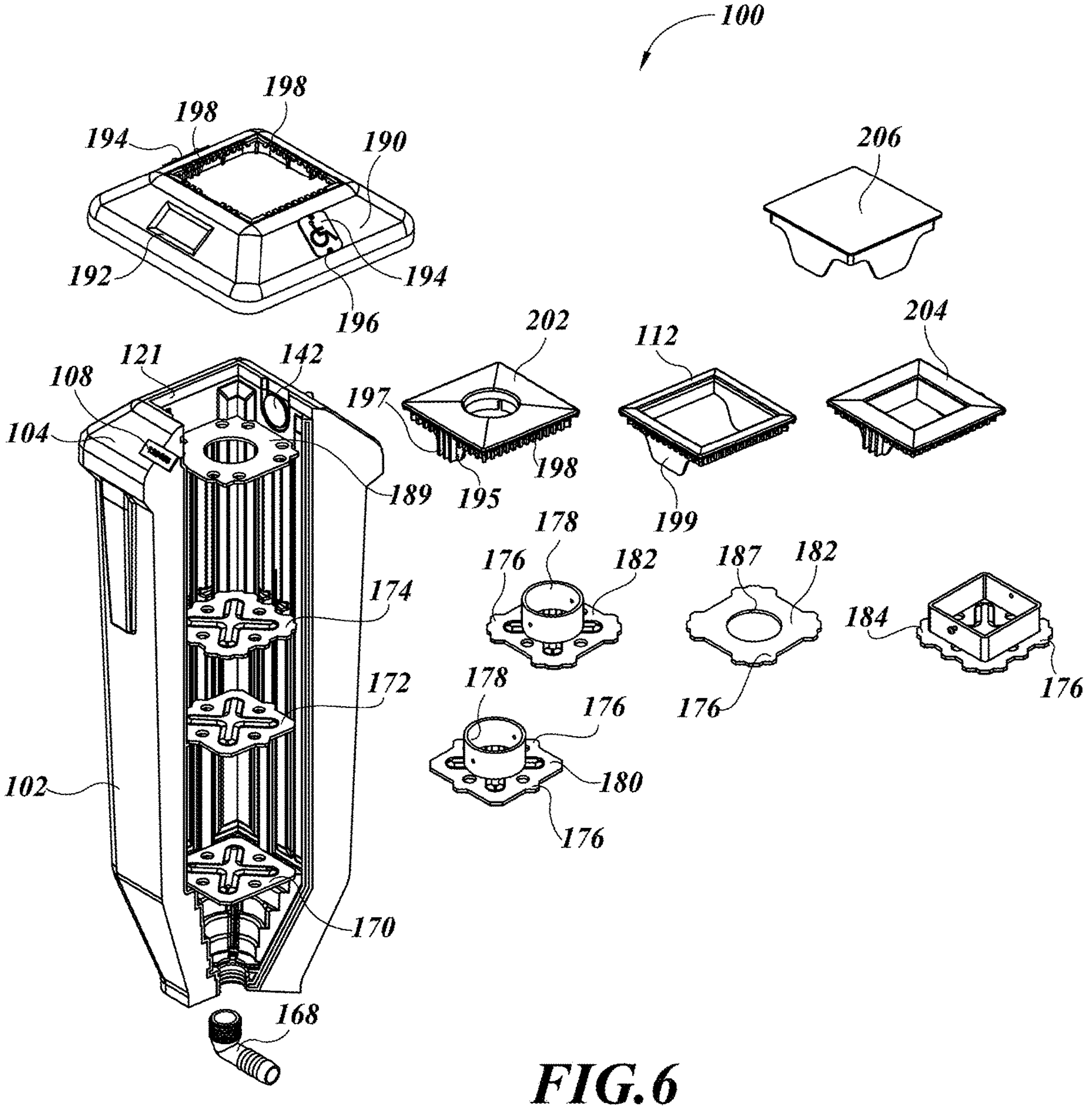
FIG. 6 is a cutaway view of the post sleeve assembly of FIG. 1 and a number of attachments and adapters for use with various post support configurations.

According to an embodiment, the lower aperture 115 sits directly on the gravel 130. Alternatively, a straight, rigid fitting is provided that extends directly down into the drainage gravel 130 below, which is advantageous where the footing is significantly longer than the post sleeve 102 to extend below a frost line. According to another embodiment, an elbow fitting 168, shown in FIG. 6, is provided to direct the flexible drain hose 114 into view from above during installation to simplify burying the flexible drain hose 114 in the drainage gravel 130. In some climates where freezing is a concern, post holes may need to be dug much deeper so that the concrete footing extends below the frost line to prevent uplift. As the installer can't physically reach to the bottom of the hole to insert the flexible drain hose 114 into the drainage gravel 130, the elbow fitting 168 can allow the installer to direct the hose into an opening provided in the sidewall of the hole 138 to assure a passage for water into the soil adjacent to the footing. It should be noted that the elbow 168 can be coupled by any appropriate method, including threaded coupling, glue, snap fitting, interference fitting, etc., and that the elbow fitting 168 and the flexible drain hose 114 can be one piece and of varying dimensions and flexibility.

It should also be noted that it is not required that the drain hose be coupled directly to the lower aperture 115. Thus, according to further embodiments, in place of a drain hose, a large diameter—e.g., 6 inch or 8 inch—rigid or corrugated plastic or cardboard tube drain tube can be employed. The lowermost outer surface of the sleeve can be shaped to be engaged by the drain tube, and may be round and may have annular ridges to engage corrugated pipe or smooth-walled tubing. Alternatively, a section of large diameter pipe can be placed at the bottom of the post hole, and the post sleeve placed so that its lower end engages the pipe. It is only necessary that the joint between the post sleeve and drainage means be sufficiently tight to prevent quantities of wet concrete from flowing in. According to another embodiment, the drain hose comprises a thin permeable membrane of plastic or fabric, for example, which is filled with drainage sand or gravel to allow drainage, but also to prevent uplift of the drain hose by displacement as the concrete is poured. The lower end of the weighted drain hose rests on the soil at the base of the hole to allow a permanent connection for water to infiltrate out of the hose. The lower end can be provided with an enlarged water-permeable or degradable pad placed in contact to the ground.

A notch 149 is provided in the sleeve liner 120 above the lower aperture 115 to receive a replaceable corrosion resistant mesh screen 146 to prevent debris from accumulating in the flexible drain hose 114 over the life of the post sleeve 102. While the spacing ribs 198 of the post collar 112 will prevent most debris from entering, some will inevitably enter. Additionally, as the post ages and eventually deteriorates, wood fragments may also drop to the bottom of the sleeve. The mesh screen 146 prevents most debris from entering the flexible drain hose 114 and blocking the drainage of the post sleeve 102. While it is true that such debris may also block the lower aperture 115 from above the mesh screen 146, it is anticipated that prior to installing a new post, the installer will vacuum out the bottom of the post sleeve 102 as necessary, to remove any such blockage. This is a much simpler operation than cleaning the area below the lower aperture, which would otherwise be necessary. In the embodiment of FIG. 5, an additional notch is provided above the mesh screen 146 as an extension of the surface of the 1⅝ inch round socket 160. This additional notch acts as a receiver for a high pressure water nozzle with vacuum assembly to engage and blow out the area below the lower aperture 115, if necessary.

Referring now to FIG. 6, a post sleeve 102 is shown, together with a variety of elements for adapting the post sleeve to accommodate various sizes and shapes of posts, and for various applications. Stop plates 170, 172, 174, 180, 182, and 184, and support plates 186 and 189 are shown, and will be described in detail below. Additionally, post collar 112, described above with reference to FIG. 2, post collars 202 and 204, sleeve cap 206, and rim cap 190 are shown, all of which will also be described in detail below.

Provided the post is adequately supported laterally, it is not required that the post extend the full depth of the sleeve. Accordingly, stops are provided at various depths within the post sleeve 102 to permit the post to be supported at less than the full depth of the sleeve. Stops are most clearly shown in the embodiment of FIG. 7. In FIG. 6, the 4×4 socket 150 is 19 inches below the upper surface of the rim 104 of the post sleeve 102. 19 inch stop plate 170 is provided to rest on the ledge of the 4×4 socket 150, and is supported laterally by standoff ribs 122. 19 inch stop plate 170 is provided as support for a 4×4 wood post in heavy post applications such as, for example, extra tall fences or signs. The 19 inch stop plate 170 is substantially square, with notched corners, and holes 171 that serve to permit water to drain past. A raised surface portion in the center of the stop plate acting as a standoff 173, strengthens the plate and holds the bottom face of the post slightly away from the plate, allowing ventilation to the bottom-most surface of the wood post. As this is the end grain, or "wicking" surface, this is the most important portion to keep dry in order to prevent rot. The 19 inch stop plate 170 can be pre-installed to the bottom of the post prior to insertion by means of a screw through one or two of the drain holes 171, or it can be dropped into place from the top opening just prior to setting the post.

The first stops above the 4×4 socket 150 are the 13 inch stops 164, which are 13 inches below the upper surface of the rim 104. 13 inch stop plate 172 is provided, including a plurality of tabs 176 extending from the edges of the plate. When the 13 inch stop plate 172 is positioned in the post sleeve 102, the tabs extend into the drain channels 124, and engage the 13 inch stops as shown in FIG. 6. With the exception of the tabs 176, the 13 inch stop plate 172 is substantially identical to the 19 inch stop plate 170. Thus, the 13 inch stop plate 172 serves to support the bottom end of a 4×4 post 13 inches below the upper surface of the rim 104. In addition to the 13 inch stop plate 172, other plates, which will be discussed in detail later, are provided that are configured to engage the 13 inch stops.

9 inch stops 166 are provided 9 inches below the upper surface of the rim 104. 9 inch stop plate is provided with tabs 176 arranged to engage the 9 inch stops 166, as shown in FIG. 6. As with the 13 inch stop plate 172, the 9 inch stop plate 174 is also substantially identical to the 19 inch stop plate 170, excepting the tabs 176, and serves to support the bottom end of a 4×4 post 9 inches below the upper surface of the rim 104.

Figure 21:
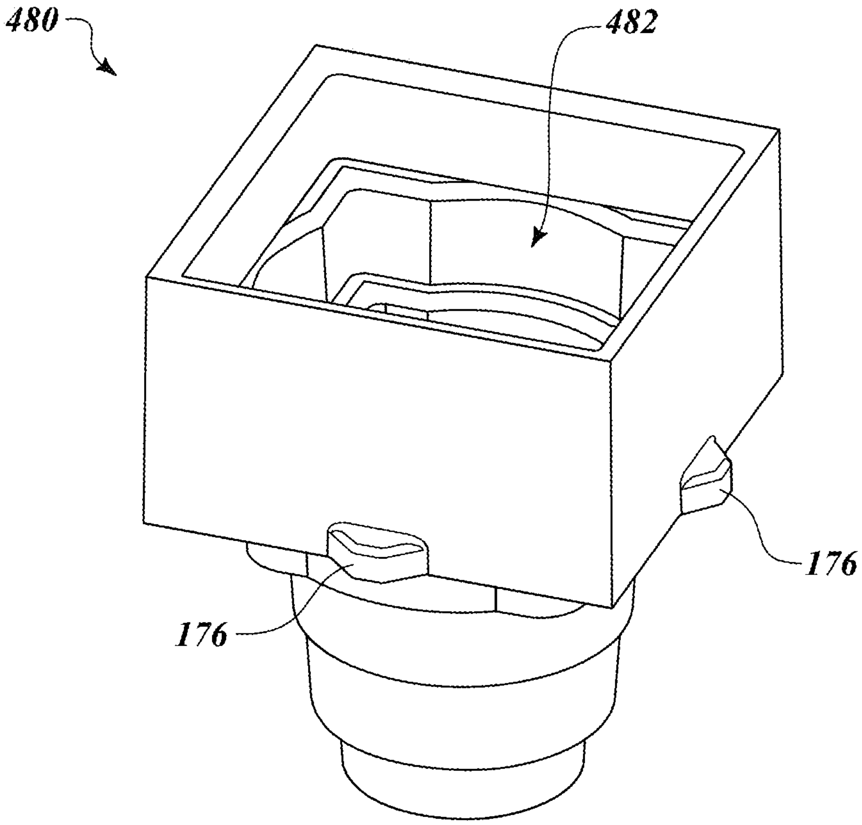
FIG. 21 shows an insert adaptor that includes a universal socket, according to an embodiment.

FIG. 21 shows an insert adaptor 480 that includes a universal socket 482 similar to the universal socket section 151 described with reference to FIG. 5, in that it is configured to receive posts of a number of different sizes and shapes. In the embodiment shown, the insert adaptor 480 is provided with tabs 176 arranged to engage the 9 inch stops of a post sleeve, as shown in FIG. 6.

Figure 8:
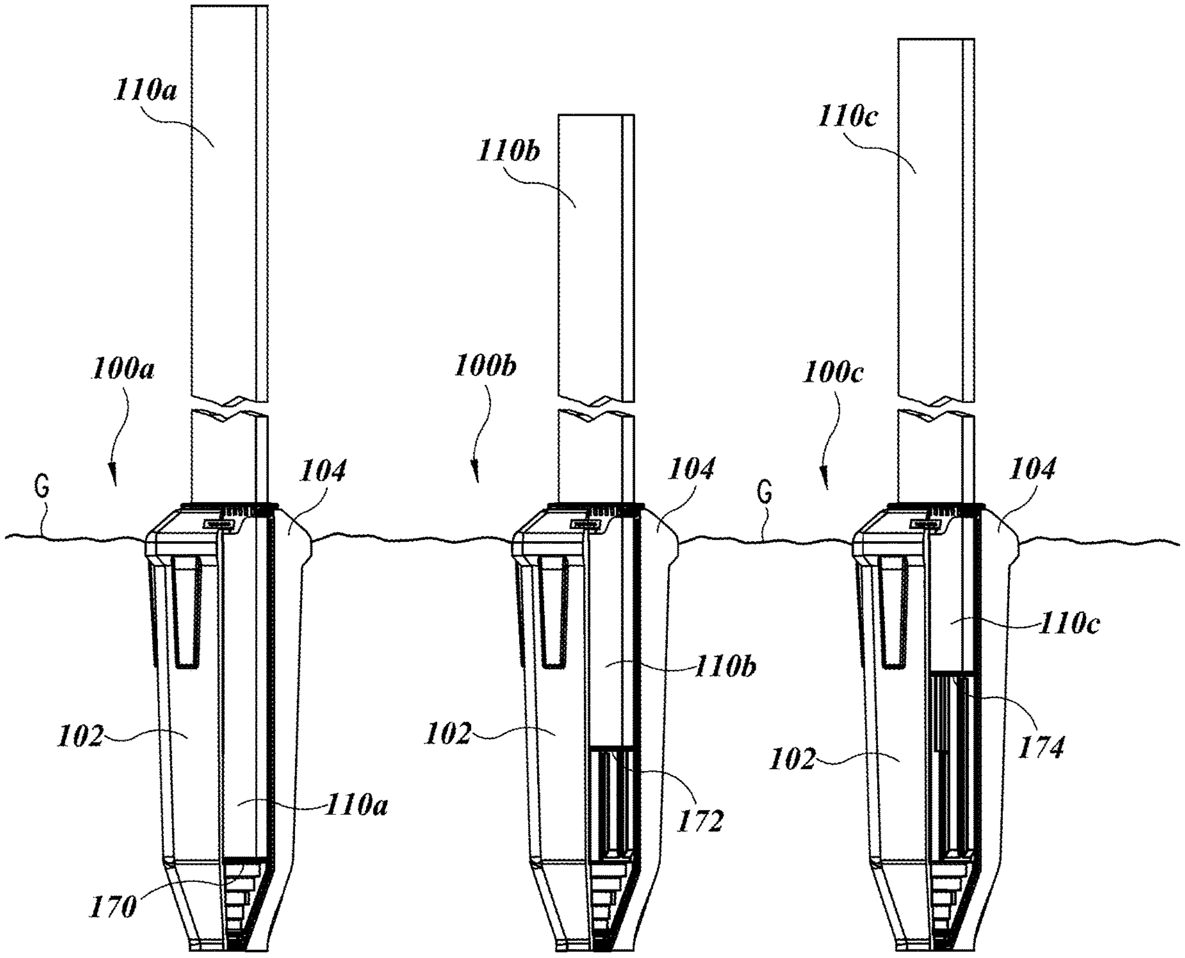
FIG. 8 shows three post sleeves in respective configurations according to an embodiment of the invention.

Referring to FIG. 8, three post sleeve assemblies 100 are shown in respective configurations: post sleeve assembly 100*a* includes an eight-foot post 110*a* supported by a 19 inch stop plate 170 at 19 inches below the top of the rim 104 of the assembly at the socket 150; post sleeve assembly 100*b* includes a seven-foot post 110*b* supported by a 13 inch stop plate 172 at 13 inches below the top of the rim 104 of the assembly; and post sleeve assembly 100*c* includes a seven-foot post 110*c* supported by a 9 inch stop plate 174 at 9 inches below the top of the rim 104 of the assembly.

Assuming that a fence of six feet in height is desired, eight-foot posts would normally be used, and set at a depth of about 18 to 24 inches, depending on how much of the post is to extend above the fence. Accordingly, the eight-foot post

110*a*, which is supported 19 inches below the rim 104 of the post sleeve assembly 100*a*, extends about 79 inches above ground level G, which is sufficient to accommodate most fence heights by trimming any excess from the post. However, by positioning a post as shown with reference to post sleeve assembly 100*b*, using a 13 inch stop plate 172 at the 13 inch stop, the post 110*b* extends six inches further above ground level G. Bearing in mind that the post sleeve 102 is to be installed with the upper surface of the rim 104 at about two inches above ground level for proper drainage, the top of the seven-foot post 110*b* is about 73 inches above ground level G, which will support a six-foot fence with one inch of clearance below. Accordingly, where an eight-foot post is normally required for a six-foot fence, a seven-foot post will serve if installed with a post sleeve and a 13 inch stop plate 172. Furthermore, by using the 9 inch stop plate 174 at the 9 inch stops 166, as shown with reference to post sleeve assembly 100*c*, the seven-foot post 110*c* extends an additional four inches above the post 110*b*. Thus, a six-foot fence can be built using post sleeves configured as shown with reference to post sleeve assembly 100*b* to support most of the posts, and the corner posts can be supported by post sleeves configured as shown with reference to post sleeve assembly 100*c* to provide additional height for the post cap to be properly placed, all without cutting any of the posts.

Furthermore, any portion of the interior of a post sleeve that lies below the bottom of the post serves as a reservoir to hold water until it can percolate into the gravel or soil below the post sleeve assembly. Thus, another desirable benefit of using plates like stop plates 172 or 174 and the stops 164,166 is that they create a larger drainage reservoir within the post sleeve 102 below the post and reduce the likelihood that standing water will contact the wicking end of the post. This is especially beneficial in climates with seasonal periods of high rain fall.

According to another embodiment, the drain channels 124 are tapered or stepped so that they are widest at the top of the post sleeve 102, and become narrower toward the bottom. Tabs on stop plates and other fittings have widths selected to engage the drain channels 124 at different heights. Thus, the position of a post within the sleeve is infinitely variable, according to the selected widths of the tabs of the stop plate employed.

Returning to FIG. 6, and by way of example, 13 inch stop plate 180, and 9 inch stop plates 182 and 184 are shown, provided with tabs 176 arranged to engage the 13 inch and 9 inch stops, respectively. 13 inch stop plate 180 is provided with tabs 176 arranged to engage the 13 inch stops 164, and with a 1⅝ inch socket 178 configured to receive a 1⅝ inch steel fence post. 9 inch stop plates 182 and 184 are each provided with tabs 176 arranged to engage the 9 inch stops. 9 inch stop plate 182 is provided with a 1⅞ inch round socket 178 configured to receive a 1⅞ inch steel fence post, while 9 inch stop plate 184 is provided with a 2½ inch square socket 185 configured to receive a 2½ inch square aluminum fence post. Additionally, 9 inch support plate 186 is shown, having tabs 176 arranged to engage the 9 inch stops. 9 inch support plate 186 includes an aperture 187 having a 1⅝ inch diameter. When a 1⅝ inch round post is positioned in the post sleeve 102, either in the 1⅝ inch socket 160 or in a stop plate such as the 13 inch stop plate 180, the post traverses the aperture 187 of the 9 inch support plate 186, which provides lateral support to the post. Finally, the upper support plate 189 is shown, provided with an aperture sized, in the pictured embodiment, to receive a 1⅝ inch round post, and configured to rest on the upper ends of the standoff ribs 122. The upper support plate 189 can be used with any length post to provide rigid lateral support near the top of the post sleeve 102.

Plates 170, 172, 174, 180, 182, 184, 186, and 189 are provided as examples only, to show a variety of plates configured to support fence posts of different sizes and shapes at various levels within the post sleeve 102, and to properly orient and support the posts in the x, y, and z axes. It will be recognized that many different configurations of stop plates and support plates can be employed for use at the 19, 13, or 9 inch levels, or any other desired levels, depending on the particular application.

The various plates described above can be inexpensively manufactured in large quantities through a wide variety of processes, including, for example, stamping or blanking. Alternatively, where a small number of non-standard plates is required, and the limited quantity of a given configuration does not justify the expense of preparing stamping dies, the plates can be made from an efficiently machineable material such as UHMW polyethylene. For example, plates with the appropriate apertures, tabs, sockets, etc., for many applications can be machined from sheets of UHMW polyethylene. One such plate is described later with reference to FIG. 12.

Figure 9:
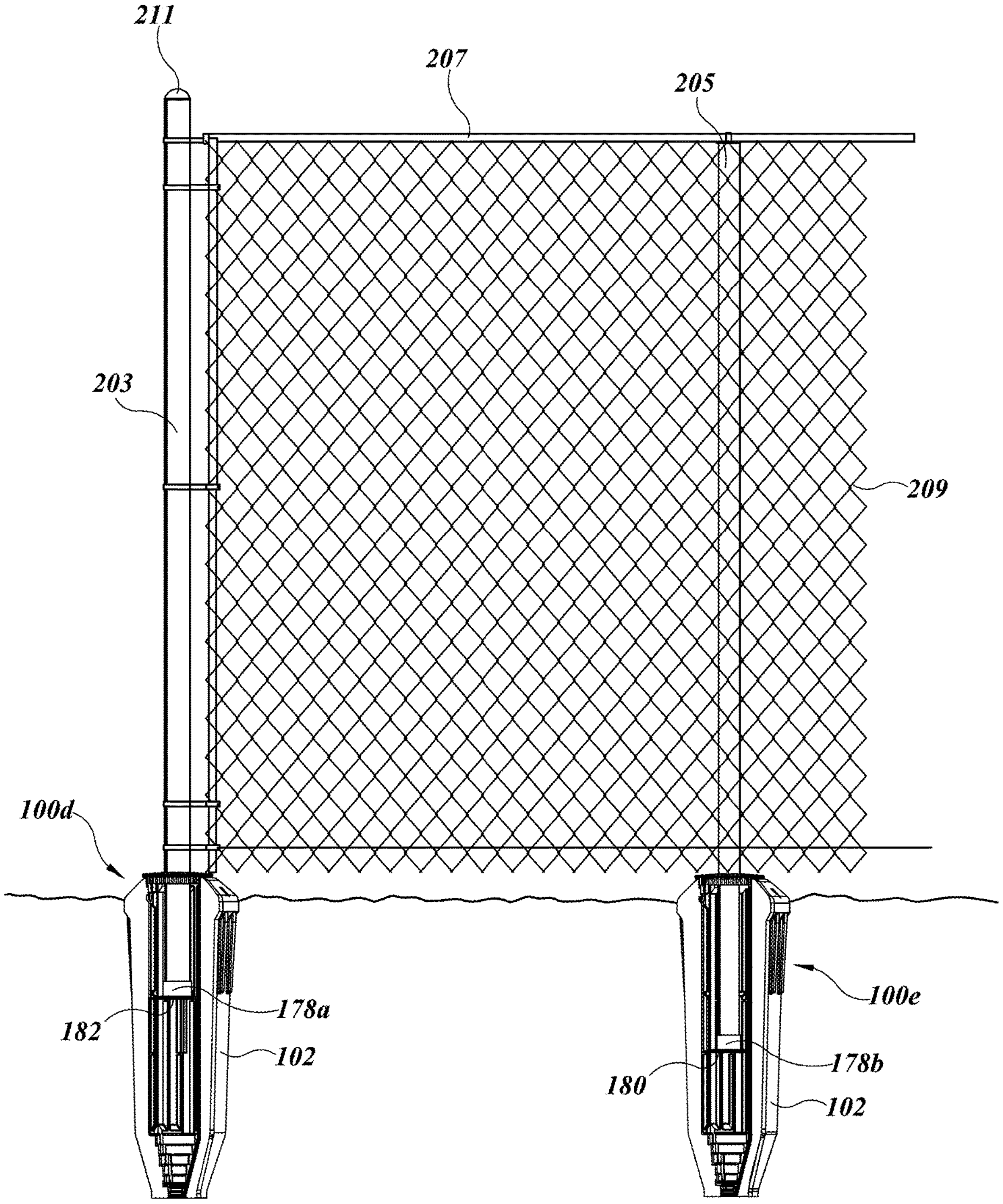
FIG. 9 shows a chain-link fence according to an embodiment.

As shown in FIG. 9, the spacing of the 13 inch and 9 inch stops 164, 166 is particularly advantageous with regard to chain link fencing. Typically, chain link fences are constructed using a combination of 1⅝ inch "line" posts, which are positioned along the run of the fence and have a horizontal tube member running along the tops for support, and 1⅞ inch "terminal" posts, which extend four inches above the line posts and typically have a rounded cap on top as a finish detail. The horizontal tube members that run along the top of the fence above the line posts tie into the sides of the terminal posts. Thus, it is necessary to provide an elevation difference of four inches between the smaller line posts and the larger terminal posts. The 13 and 9 inch stops 164,166 in the post sleeve 102 are spaced from the top of the post sleeve 102 in a manner that allows an industry standard 7 foot steel tube line post or terminal post to be placed in the post sleeve 102 obtaining the maximum amount of penetration while still allowing a workable height to construct a 6 foot chain link fence with no cutting of the tubes and no wasted material, and while still allowing the bottom of the 6 foot fence to clear the top rim 104 of the post sleeve 102.

FIG. 9 shows a first post sleeve assembly 100*d* with a stop plate 182 and a 1⅞ inch socket 178*a* at the 9-inch stops 166, supporting a 1⅞ inch terminal post 203 with a cap 211. A second post sleeve assembly 100*e* has a stop plate 180 and a 1⅝ inch socket 182*b* at the 13-inch stops 164, and supports a 1⅝ inch line post 205. A horizontal tube 207 extends from the terminal post 203 over the line post 205 and supports a section of chain link fencing 209. Because of the spacing between the stops 64 and 66 of the post sleeves 102, the tops of the line post 205 and terminal post 203 are properly spaced for the standard fence configuration, without the need to cut either post.

Returning again to FIG. 6, various embodiments of post collars are shown, as examples for use with different cross sections and sizes of posts. For example, post collar 112 is configured to accommodate a 4×4 square post, post collar 202 is configured to accommodate a 1⅞ inch round post, and post collar 204 is configured to accommodate a 2½ inch square tube. Of course, the post collars shown are merely exemplary; post collars can be provided to accommodate any post that the post sleeve 102 can receive. The material of the post collar is selectable according to the particular application. Furthermore, a flexible gasket can be positioned between the post and a post collar to provide additional protection from water that would otherwise run between the collar and the post. Where a post is fully supported laterally within the sleeve by the standoff ribs 122 or by a support plate, the post collar may serve merely to provide a finished appearance and shed water. The post collar may also be configured to provide a degree of resilience or weakness, depending on the desired functionality. For example, according to an embodiment, a plastic post collar is provided for use with parking lot signs, such as "Handicap Only" parking signs, installed with on a square tubular metal post. The collar is configured to repeatedly fail on impact by popping out of its aperture, only to be snapped in again with no damage, to save the post from—likely frequent—minor bumper impacts. In this way, with minor bumper impact, the plastic collar will pop out or break before the post itself bends or breaks, permitting the post to pivot on a 9 inch stop plate, for example, thereby saving the post and potentially the post collar.

Post collars are generally provided with spacing ribs 198 that hold the collars up off the angled top surface of the rim 104 and penetrate into the upper aperture 121 of the post sleeve 102, providing insect and debris resistant ventilation channels while also transmitting lateral load from the post to the internal face of the post sleeve 102. The spacing, thickness, and length of the spacing ribs 198 can be chosen to provide more or less lateral resistance to accommodate, for example, a resilient or breakable model intended to protect a post from damage due to minor impacts. Alternatively, a hardened post collar can be provided, that includes a sharp edge to focus lateral force, so that under a selected lateral force, the post will tend to shear off cleanly at or below grade, to reduce the likelihood of injury when the post is struck by a moving vehicle, and to reduce or eliminate the resulting hazard of a splintered post stub that might otherwise stand in that location until the post can be replaced. In such embodiments, it may be beneficial to provide one or two holes through the post in each direction, in a position that corresponds to the sharp edge of the sleeve, to further encourage a clean break at that position. As a further alternative, the sharp edge can be pre-formed or installed into the sleeve itself, and used in combination with a resilient collar so that a post is protected from impacts up to a threshold, but will breakaway under impacts that exceed the threshold. Where a post sleeve is Pressure tabs 199 are positioned so as to be engaged by the fastener 142 and transmit pressure from the fastener to the post to lock the post in position. Where the post collar is configured to support a post that is smaller than the 4×4 post size, an inner pressure tab 195 is provided, with extension ribs 197 or similar structures extending onto the inner pressure tab 195 to provide the necessary transition to be engaged by the fastener and to transmit the pressure to the post.

According to an alternate embodiment, the fastener is configured to engage the post directly. Where a smaller post is to be installed and direct contact with the post is desired, the standard fastener is removed, and a longer fastener is positioned in its place. The post is then installed in the post sleeve and the longer fastener is driven in to engage the post.

Sleeve cap 206 is configured to be positioned in the upper aperture 121 of the post sleeve 102 to close the upper aperture 121 during periods of non-use or between the time the post sleeve 102 is installed in the ground and a post is inserted. The sleeve cap 206 serves to prevent the introduction of rocks and debris into the post sleeve 102, and also to prevent injury to pedestrians or animals when not in use. Like the post collars, the sleeve cap can be constructed of any suitable material including, for example, steel, aluminum, and plastic.

In the embodiment of FIG. 6, rim cover 190 is constructed of UV resistant injection molded plastic, and can be any suitable color. The rim cover is configured to snap into place on the post collar 112 and rest over the rim 104 to provide a substrate for identification or information that is temporary, as compared to the expected life expectancy of the post sleeve 102, or that is added after the post sleeve 102 is manufactured. For example, in FIG. 6, a sign plate 194 with a handicap symbol is shown coupled to the rim cover 190 by fasteners 196, which can be rivets, screws, nuts and bolts, etc. Additionally, or alternatively, the surface of the rim cover can be directly marked using vinyl or screen printed images, or by engraving or embossing, for example.

It can be seen that the rim cover 190 provides a number of surfaces that can be used, for example, by the installation contractor to place a logo or contact information, or to identify the function of the post, as in the example pictured, or to provide a backup sign or an indication of the necessary replacement in the instance where the post becomes snapped off. Other examples of uses for the rim cover 190 are reflective address markings at the bases of posts supporting mail boxes for fire and rescue, reflective "Stop" with red plastic body color for "Stop Signs" and added visibility, "No Trespassing" warnings for property lines etc. Spacing ribs 191 provide clearance between the rim 104 and the rim cover 190 for the fasteners 196. The spacing ribs 198 extend to the aperture and line up with the spacing ribs 198 in the post collars to provide continuous air ventilation as described above.

The rim cover 190 comprises an aperture 192 in a position that corresponds to the position of the identification plate 108, such that when the rim cover 190 is coupled to the rim 104 of the post sleeve 102, the identification plate 108 is visible through the aperture 192. In those embodiments where the identification plate 108 is not employed, or where it is not required to be visible, an additional plate or cover can be snapped into the aperture 192. The rim cover 190 can also be equipped with motion sensors, solar cells, luminosity cells, lighting and audible effects, etc., as described above with reference to the post collars.

The stops, stop plates, support plates, post collars, sleeve caps, and other elements described above with reference to FIG. 6 are shown and described merely as examples. It is within the abilities of one of ordinary skill in the art to provide such items with any dimensions or configuration or in any suitable material, as necessary for a given application.

The inventor has recognized that a particular problem in the fencing industry is that fences are often built from scratch on site, meaning adjoining segments of a fence may not be identical, and that, even where prefabricated fence panels are employed, many will be modified or customized to fit specific spans and angles between posts. When a portion of a fence is damaged or knocked down, it is generally necessary for a fence contractor to bring to the site all the materials necessary to re-fabricate the damaged portions of the fence, and often to reproduce a complex pattern using materials and equipment on hand, or, alternatively, to come to the site a first time to take measurements and patterns, then fabricate replacement panels and return to the site to install them.

According to one embodiment, the identification plate 108, described above with reference to FIGS. 1 and 2, is part of a system that addresses many of these problems. The identification plate 108 of each post sleeve is provided with a unique identifier that is affixed either during fabrication of the post sleeve or during installation. During installation of a new fence, the installer records the unique identifiers of each post sleeve, together with all the pertinent information about the fence, including the pattern, color, material, dimensions, etc. The location of each post sleeve is recorded, as well as the positioning of each sleeve relative to other sleeves, in the x, y, and z axes and in orientation. The information is deposited in a central database maintained by the post sleeve manufacturer or an independent repository. Additional information stored in the database can include property boundary surveys, CAD drawings of the actual fence, scale images of each panel, a bill of materials for the production, finish colors, materials used, etc.

In the event a repair is required, the property owner makes note of the identifiers of the post sleeves that are involved and contacts a contractor—either the original contractor, whose contact information may be provided on the rim or rim cap of at least one of the post sleeves, as described above, or another qualified contractor—and provides the identifiers and a description of the damage. The contractor then accesses the database, via a secure website, for example, and obtains the details and dimensions of the fence design, and, more importantly, the specific details of the fence panels associated with the identifiers provided by the property owner. The contractor can then fabricate the replacement fence sections in a shop to replace the damaged sections, to the precise dimensions and pattern of the original, then transport the completed sections and install them at the site. The property owner may, alternatively, choose to order the replacement sections and install them herself, without the assistance of a contractor. Even though the fence dimensions will vary from one span to the next, the identifying numbers on the post sleeves will provide the exact location with the exact dimensions. This saves considerable time and expense, as well as reducing waste, because material optimization is much easier in a controlled shop environment than in the field. Because the information is maintained at a central database, it can be accessed by the contractor or property owner, even if the original contractor is no longer in business.

Similar systems are provided, according to other embodiments, to track the location and details of commercial signs, traffic signs, guard rails, etc. If, for example, a traffic sign is damaged or deteriorated, an inspector need only take note of the identifying number on the identification plate of the post sleeve in which the supporting post is mounted, and relay the number to the appropriate authority. The database will provide such details as the text and size of the sign, the height of the post, the materials of the sign and post, and even the replacement history of that particular sign. The replacement sign can be assembled according to the specifications, and installed.

According to an embodiment, the identification plate 108 includes a bar code number, which simplifies the capture of the identifier, and prevents transcription errors. The operator, when recording the pertinent information, scans the bar code with a portable scanner, and then enters the associated data.

According to another embodiment, a radio-frequency identification (RFID) tag is provided, either as part of the identification plate 108, embedded in the body 116 of the post sleeve 102, or otherwise attached thereto. When an interrogation signal is transmitted from a nearby RFID reader, an antenna of the RFID tag collects power from the signal and activates a transmitter circuit that transmits the unique identifier of the respective post sleeve, which is received by the reader. As is well known in the RFID art, RFID tags can be extremely simple, providing only basic identification information, or can be more complex, comprising a non-volatile memory to store a significant amount of data, either in a read-only format or in a read-write format. Accordingly, in some embodiments, additional information that may be relevant to a particular application can be saved in the RFID tag of a post sleeve for later retrieval. The RFID tag can also be detected by properly equipped emergency or delivery vehicles to assist them in locating a specific location or address.

The term unique identifier is used broadly to refer to an identifying element that is unique to a single post sleeve and that distinguishes one post sleeve from other post sleeves. The unique identifier can be a string of letters, numbers, symbols, or a combination of elements. It can, for example, comprise a serial number applied to a post sleeve during fabrication, or a string of characters that includes additional information relative to the make or model of the post sleeve, or its date or place of manufacture.

According to an embodiment, a unique identifier associated with particular post sleeves is maintained in a database, and includes data necessary to locate each post sleeve, such as, for example, one or more of: GPS coordinates, street address, and positioning data with respect to nearby post sleeves or other reference features. It is therefore not necessary to physically mark or label each sleeve, because each is identifiable from the database, on the basis of its unique location.

Figure 7:
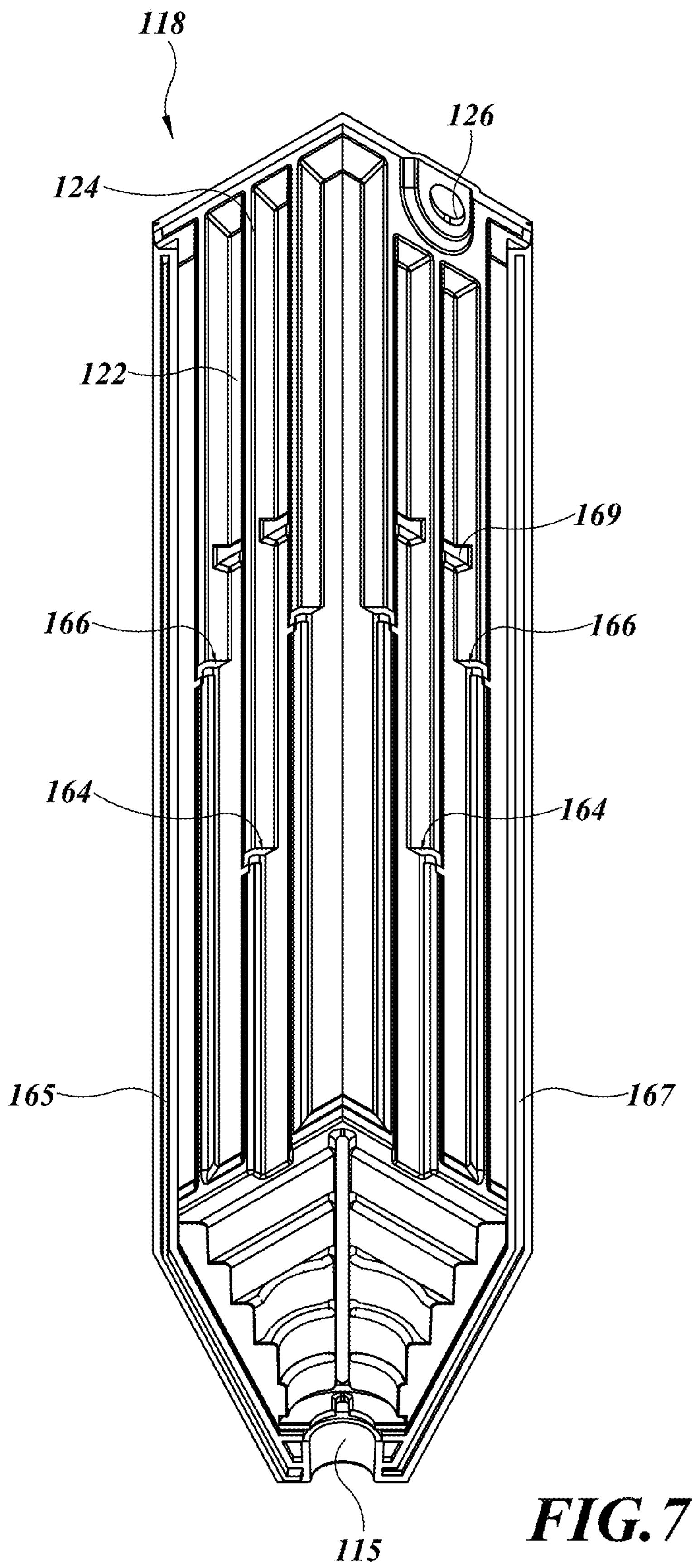
FIG. 7 shows a sleeve liner section according to an embodiment of the invention.

Referring now to FIG. 7, a single liner section 118 is shown, according to an embodiment in which the sleeve liner 120 comprises two substantially identical injection molded liner sections. The liner section 118 includes a tongue element 165 extending down the left edge, as viewed in the drawing, while a groove 167 extends down the right edge. When two such sections are positioned face-to-face, the tongue element 165 of one section engages the groove 167 of the other section, and vice-versa, permitting the two sections to be pressed or snapped together to form the sleeve liner 120. In the illustrated embodiment, the two sections snap together, although any appropriate fastening means can be used to couple the sections 118, including solvent or electronic welds, clips, tape, etc. It is only necessary that the two sections hold together while the concrete body 116 is cast around them to form a single integral unit.

As described above with reference to FIG. 6, the liner sections 118 include 13 inch stops 164 and 9 inch stops 166 configured to be engaged by the tabs of the respective stop plates to support a post at those depths below the rim of the post sleeve. In the embodiment pictured, two sets of stops are shown, but the invention is not limited to two sets of stops, or to the specific dimensions described. Liner sections can be provided with more or fewer sets, and according to some embodiments, there are none.

Detents 169 are provided to assist in installation of the post sleeve 102. According to an embodiment, the detents 169 are engaged by an installation mechanism configured to support the post sleeve from an overhead structure, so as to permit the sleeve to hang plumb at the desired height in the hole 138 while an installer pours the concrete footing. In this way, the post sleeve can, if required, be provided with a concrete footing that extends some distance below the sleeve without requiring support from below while the concrete footing cures, and can be properly oriented and plumbed.

While the sleeve liner 120 has been described in combination with a prefabricated concrete sleeve body, the sleeve liner 120 can itself serve as a preformed post sleeve, fixed in a concrete footing in the field, without the prefabricated concrete body. For example, where the extreme longevity and other advantages afforded by the high-strength prefabricated body are not primary considerations, it may be advantageous to omit the concrete body, and instead to use the sleeve liner 120 as a preformed sleeve and pour the footing around it. In another example, where a large surface is to be paved, with a number of sleeves provided to support posts, e.g., to support a guardrail along a concrete walkway, the sleeve liners can be set directly in the concrete, as sleeves, during the pour of the walkway to provide a clean and unified appearance.

Figure 10:
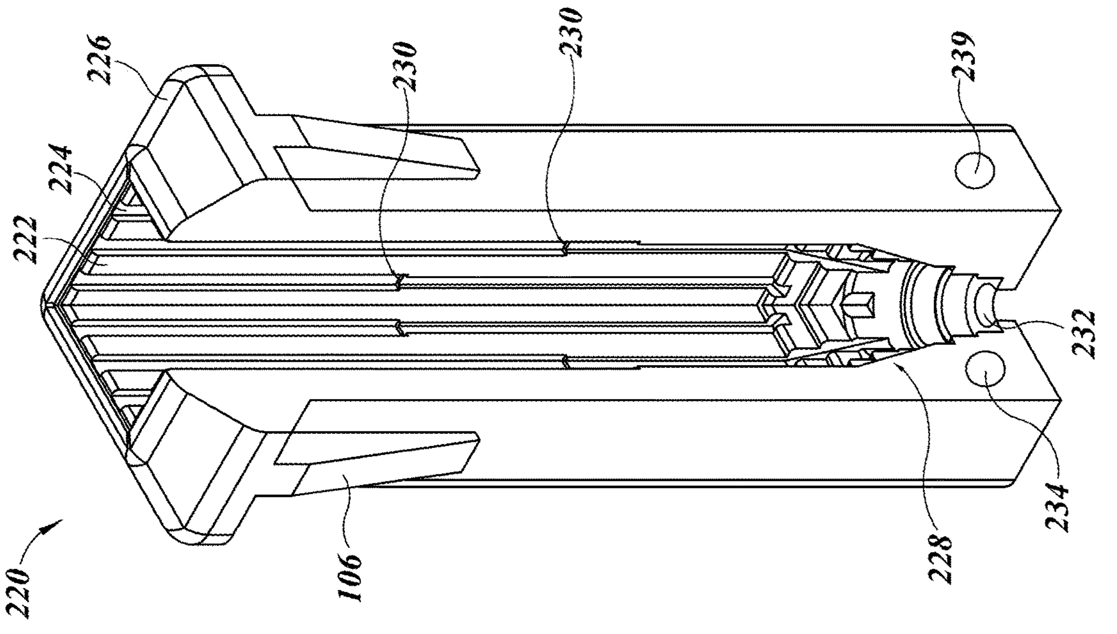
FIGS. 10 and 11 show post sleeves according to respective embodiments.

FIG. 10 shows an embodiment in which a post sleeve 220 is cast directly from concrete or other suitable material, without a separate liner. The post sleeve 220 includes ribs 222 and drain channels 224 that are substantially analogous in function to the standoff ribs 122 and drain channels 124 described with reference to FIGS. 2-7. A universal socket section 228 is provided, having individual sockets configured to receive posts of a variety of dimensions, much as described with reference to FIG. 5, and stops 230 are shown at various depths below the rim 226, as described with reference to FIGS. 6 and 7. A coupling configured to engage a drain hose can be press fitted or cast into the lower aperture 232 of the sleeve liner 220 during the casting process. Alternatively, the aperture can be left smooth, as shown in FIG. 10, and the drain hose affixed with a common construction adhesive, or the aperture 232 can be sized to receive the hose in an interference fit.

Also shown in FIG. 10, horizontal holes 234 are provided extending through the lower-most part of the post sleeve 220. In climates where annual freezing and thawing cycles might tend to lift the post sleeve 220 out of the ground, short pieces of rebar are positioned in the holes 234 to establish a more secure engagement between the post sleeve 220 and the concrete footing, to prevent uplift. In other cases, concrete that flows into the holes 234 during installation of the post sleeve 220 may be adequate to prevent uplift.

In many cases, it is not desirable to permit a wood post to directly contact the concrete of the post sleeve. Accordingly, where the post sleeve is cast without a separate sleeve liner, such as the embodiment of FIG. 10, an interior coating can be sprayed in, to isolate the post from the concrete. If necessary, at intervals over the life of the post sleeve, the coating can be re-sprayed at the same time that the post is replaced.

Figure 11:
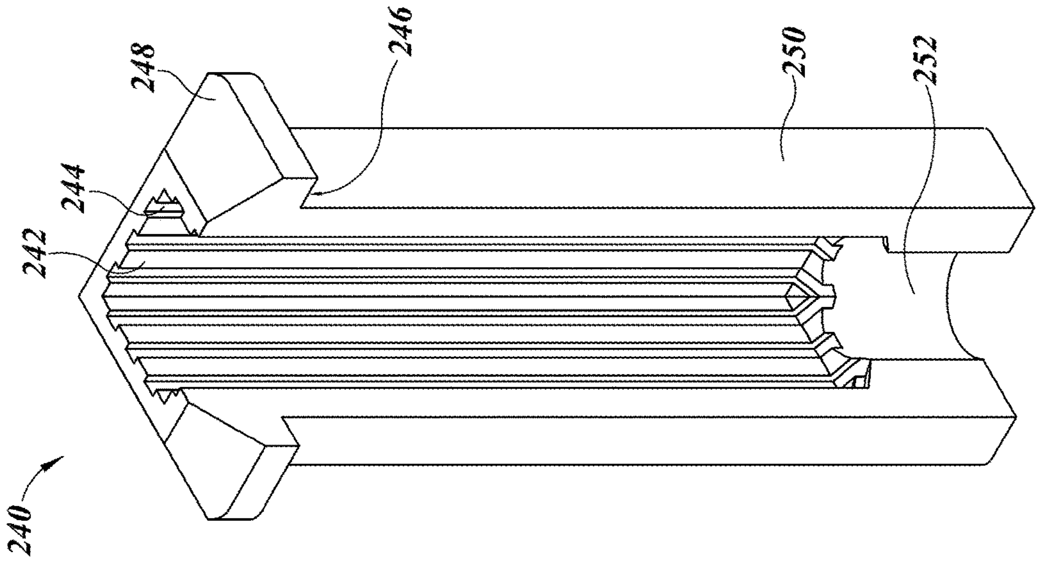

FIG. 11 shows a post sleeve 240 that, like the embodiment of FIG. 10, is cast directly from concrete or other suitable material, without a separate liner. The post sleeve 240 includes ribs 242 and drain channels 244, a lower aperture 252, a rim 248, and a lower body portion 250. The post sleeve 242 is configured to receive a single size of post, and does not include a universal socket section, nor stops. In certain high volume applications where a large number of post sleeves are required for a single size of post, it may be economically or structurally advantageous to manufacture a custom post sleeve configuration for that size. This may be true where, for example, because of the dimensions of the posts, stop plates and support plates would be required for each post sleeve, or where the anticipated lateral loads on the posts will possibly render standard stop and support plates inadequate.

Also shown in the embodiment of FIG. 11, it can be seen that the soffit 246 is substantially perpendicular to the vertical sides of the body 250, and that the sides of the lower body 250 do not include reinforcing ribs analogous to the ribs 106 of FIG. 1. This configuration is useful in applications where the soffit is intended to engage a supporting surface. For example, where a post is to be installed into a previously paved surface, an opening is cut in the pavement, with a size that is smaller than the outer dimensions of the rim 248 but large enough to receive the lower body 250. According to one embodiment, the lower body of the post sleeve is cylindrical, such that a circular hole only slightly larger than the lower body can be bored in the pavement and the underlying material so that the post sleeve can be dropped into the hole and will be adequately supported without a concrete footing. It may be advantageous to apply an adhesive between the soffit and the pavement to prevent prying up of the post sleeve, and to prevent water from entering the hole from the surface of the pavement. In such an embodiment, it may also be advantageous to have a port through the sidewall of the sleeve to allow the injection of a foam or grout material or adhesive to fill the void between the sleeve and the pavement, and under the pavement.

Figure 12:
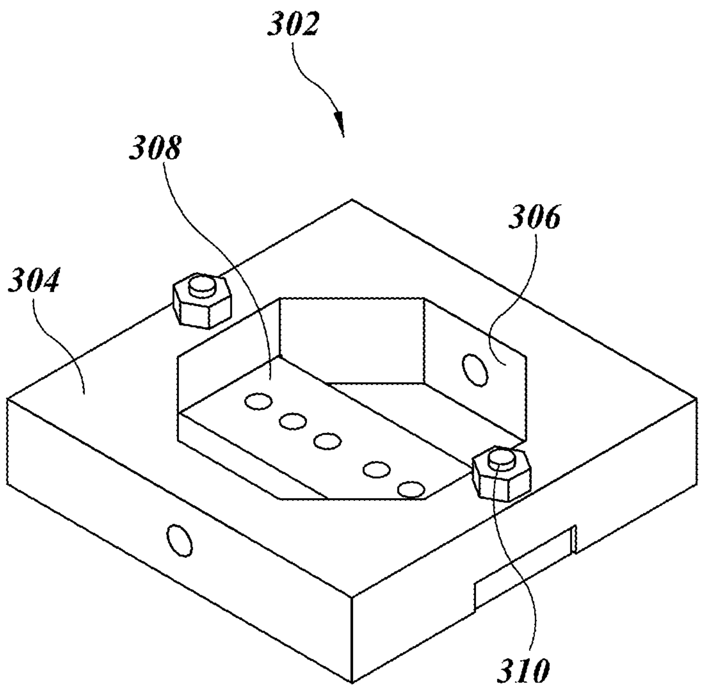
FIG. 12 shows a transition fitting for a post sleeve, according to an embodiment.

FIGS. 12-20 show details of post sleeve assemblies according to various embodiments. According to the embodiment of FIG. 12, a flange transition fitting 302 is provided, that is sized to fit an odd sized post, such as, for example, a 1½ inch square tube, or a metric tube, or an odd shaped post such as the hexagonal post shown in FIG. 12. In this way, a non-standard post can be installed in the closest appropriate socket of the universal socket section 151 of a post sleeve. The embodiment pictured in FIG. 12 is configured to fit in the 4×4 socket 150 of the post sleeve 102, and comprises a body 304 of UHMW polyethylene with a hexagonal socket 306 machined therein. A steel plate 308 is coupled to the body 304 by fasteners 310 to provide vertical support to a post, while the body and socket provide lateral support. Other fittings and plates, such as post collars, support plates, etc., or transition pieces configured to snap into standard fittings, can be produced in small volumes by standard machining methods, as previously described.

Figure 13:
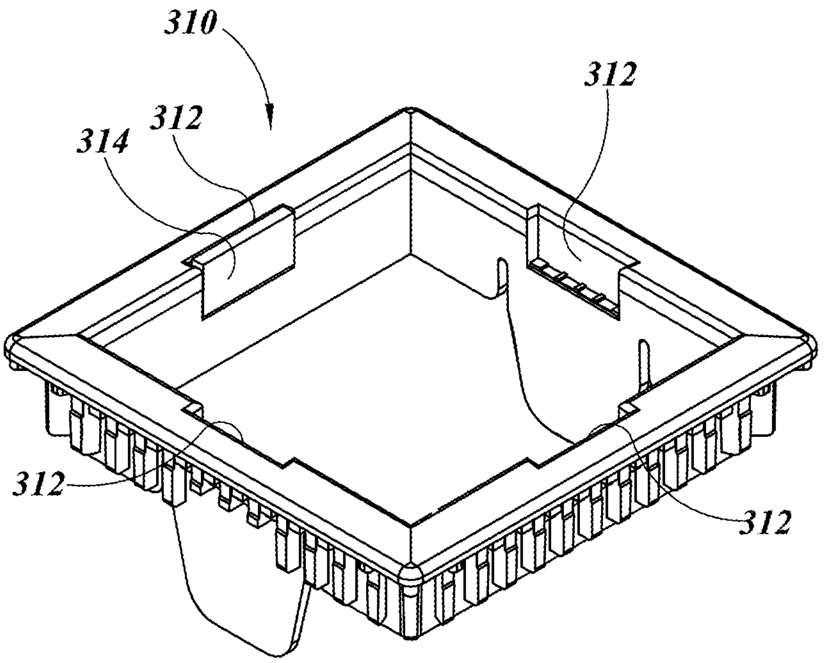
FIG. 13 shows a post collar with slots configured receive replaceable pesticide tablets, according to one embodiment.

FIG. 13 shows a post collar 310 with slots 312 configured receive replaceable pesticide tablets 314 to discourage harmful insects from entering the post sleeve. Because the tablets are positioned to place vapor or runoff precisely where it is required, within the enclosed space around the post and inside the drainage channels 124 and reservoir of the post sleeve 102, the tablet 314 can be configured to release very minute amounts of chemical over a prolonged period of time.

Figure 14:
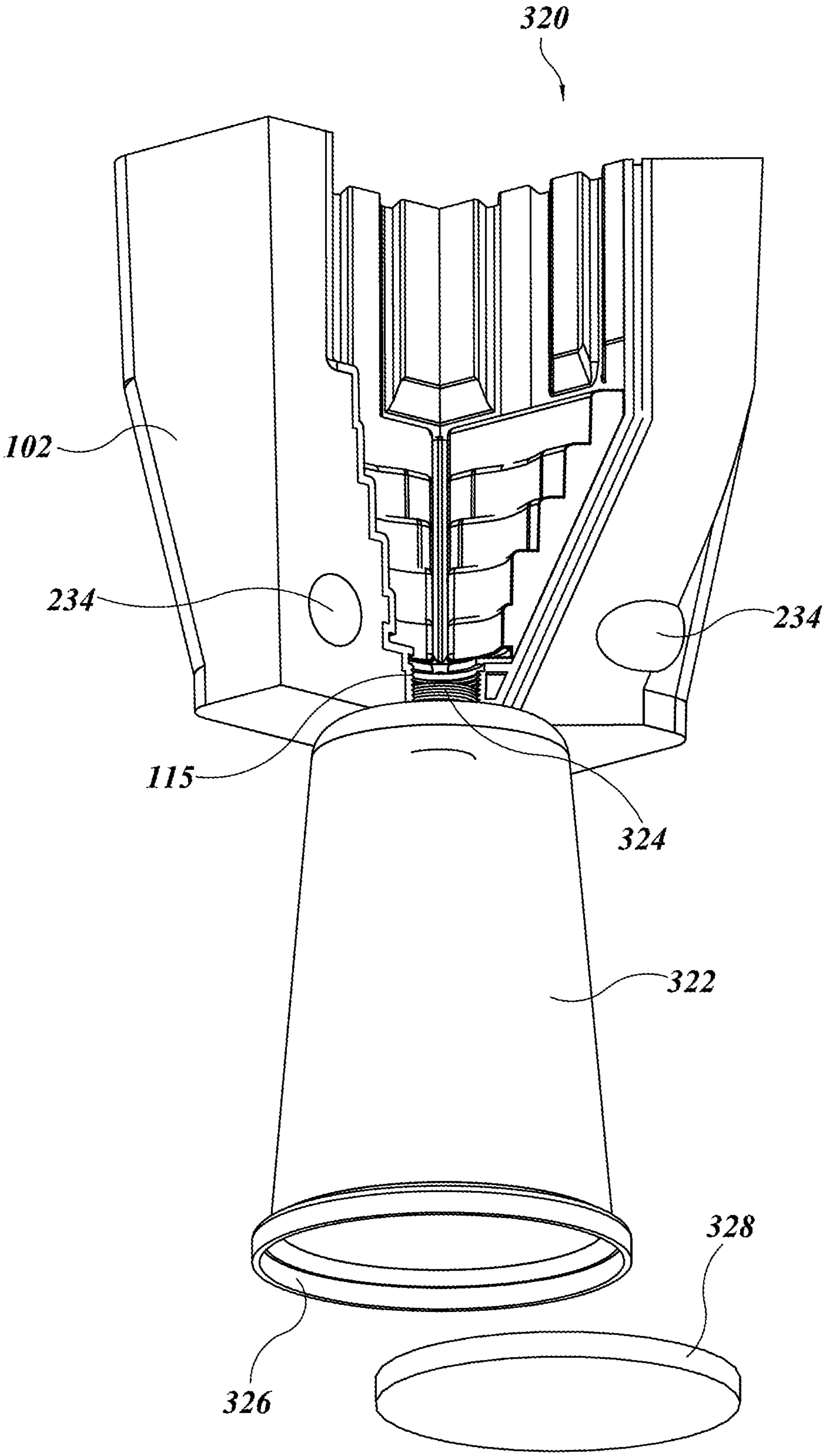
FIG. 14 shows a post sleeve assembly according to an embodiment.

FIG. 14 shows a sleeve assembly 320 that includes a reservoir 322 positioned beneath a post sleeve 102. The reservoir 322 includes a threaded neck 324 configured to engage threads in the aperture 115 of the post sleeve 102 or at the lower end of a drain hose, and has a large opening 326 configured to provide open contact with the surrounding concrete. A temporary barrier 328, such as a cardboard panel, is provided in an opening of the reservoir to prevent entry of concrete during the pour of the footing. The barrier 328 disintegrates the first time it is contacted by water, and thereafter does not impede contact of water with the concrete. The concrete of the footing surrounding the reservoir 322 is provided with a selected porosity, such as by controlled entrainment of air, to function as a slow-flow barrier, to permit very slow passage of water from the reservoir 322 to the surrounding soil. In some environments, there may be periods during which the water table rises near the surface, either seasonally, or in response to heavy rains. Sleeve assemblies that are configured to allow water to flow quickly out, may also allow water to flow quickly in when the water table rises above the lower aperture, which can subject the post to continuous contact with the water until the table drops again. The slow-flow barrier of concrete is configured to limit the passage of water so that days or weeks may be required for water to fill the reservoir 320, with the volume of the reservoir selected to accommodate water entering from the post sleeve 102 as well.

According to a related embodiment, a reservoir is provided that is covered with gravel or sand before the footing is pouring, and a slow-flow membrane is provided to regulate the flow of water into the reservoir from outside the post sleeve 102. The slow-flow membrane 326 can be formed by providing a plurality of openings of a selected size in the reservoir, or can be a material with a selected porosity positioned over an open bottom of the reservoir.

Figure 15A:
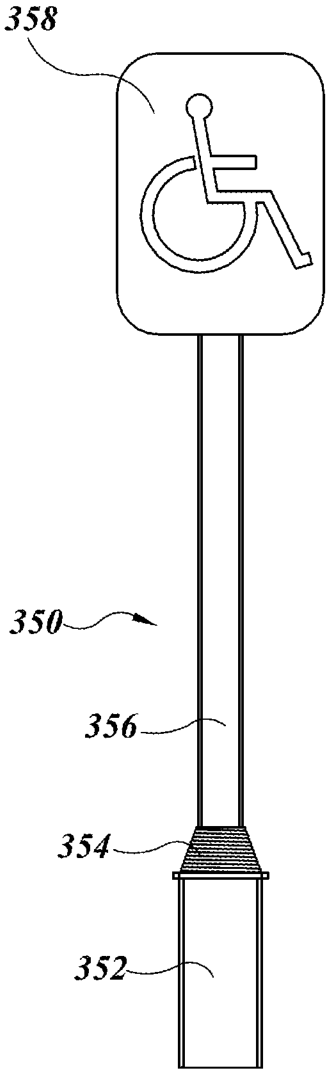
FIGS. 15A and 15B show a post assembly for use in applications where a post is likely to be contacted repeatedly by vehicles.
Figure 15B:
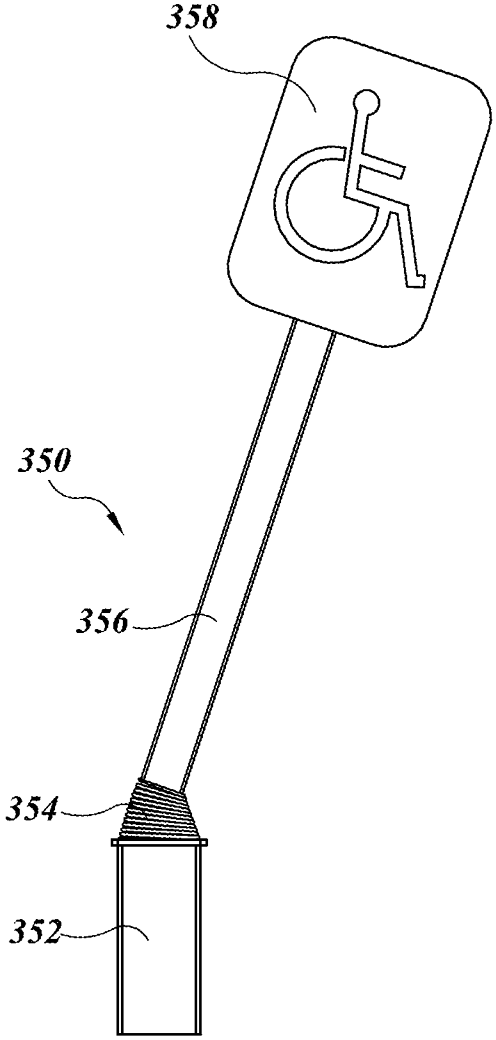

FIGS. 15A and 15B show a spring-loaded post assembly 350 for use in applications where a post is likely to be contacted repeatedly by vehicles, such as in parking lots, for example. The post 350 includes a sleeve engagement element 352 configured to be positioned within a 4×4 post sleeve. A stiff spring 354 is coupled to an upper end of the sleeve engagement element 352, and a post 356 configured to receive a sign 358 is coupled to an upper portion of the spring 354. Under normal conditions, the spring 354 holds the post 356 erect, as shown in FIG. 15A, but when subjected to the an impact, such as by a vehicle bumper, the spring 354 flexes, permitting the post 356 to yield to the impact, as shown in FIG. 15B, thereby avoiding damage.

Figure 16:
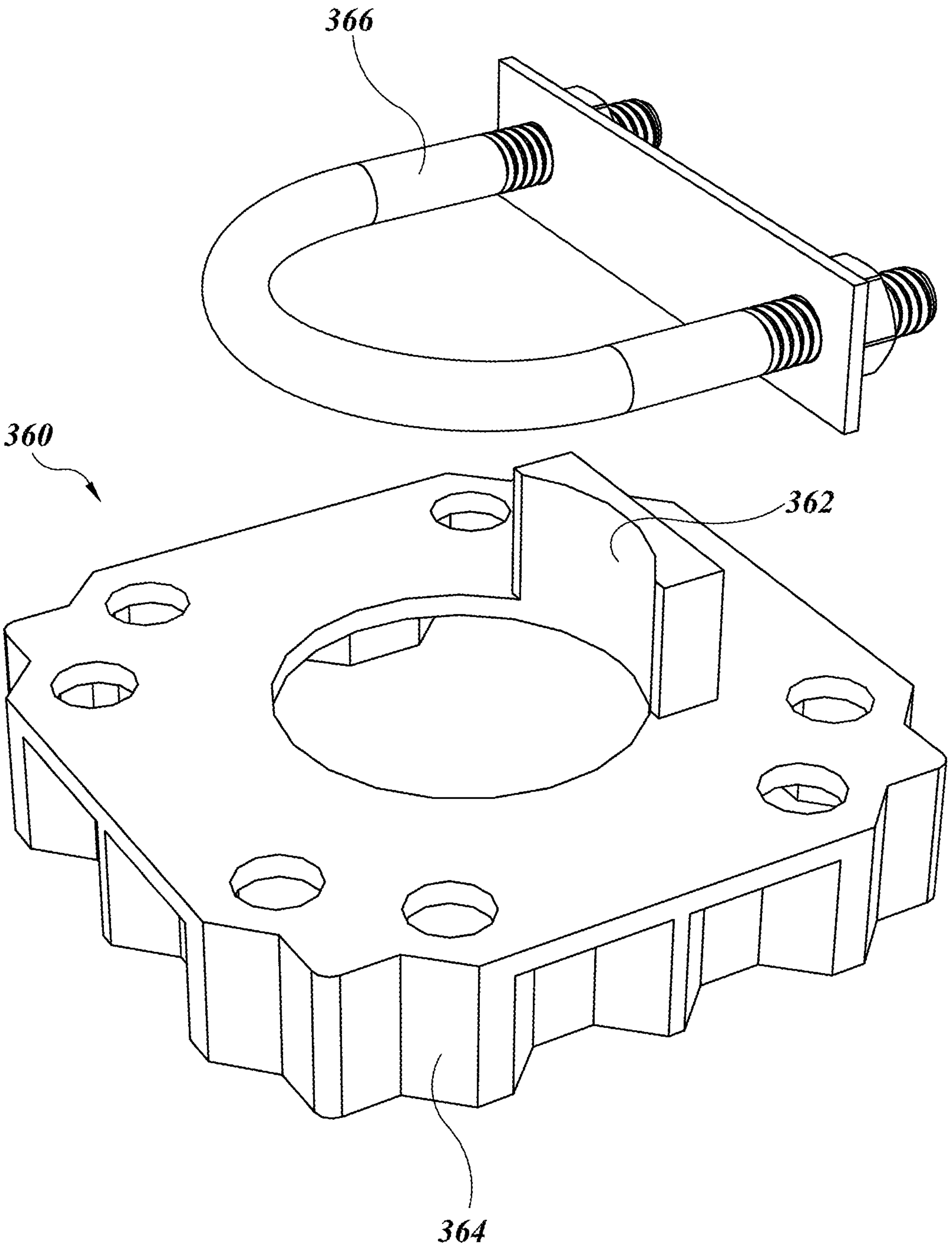
FIG. 16 shows a support plate for use with a round post, configured to prevent rotation of the post.

FIG. 16 shows a support plate 360 for use with round posts, and including a flange 362 that is configured to be engaged by a pipe clamp 364. When a round post is used to support a sign, for example, the sign may be prone to rotation around the longitudinal axis of the post because of wind forces against the sign face. The pipe clamp 364 firmly grips the post and the flange 362 of the support plate 360. Because the support plate is square, it cannot rotate within the post sleeve, and thus prevents rotation of the post. The support plate 360 includes extended sides 366 that engage the interior of the post sleeve over a substantial surface area to distribute the load and permit the inner surface of the post sleeve to tolerate the rotational forces transmitted by the support plate 360 without damage.

Figure 17:
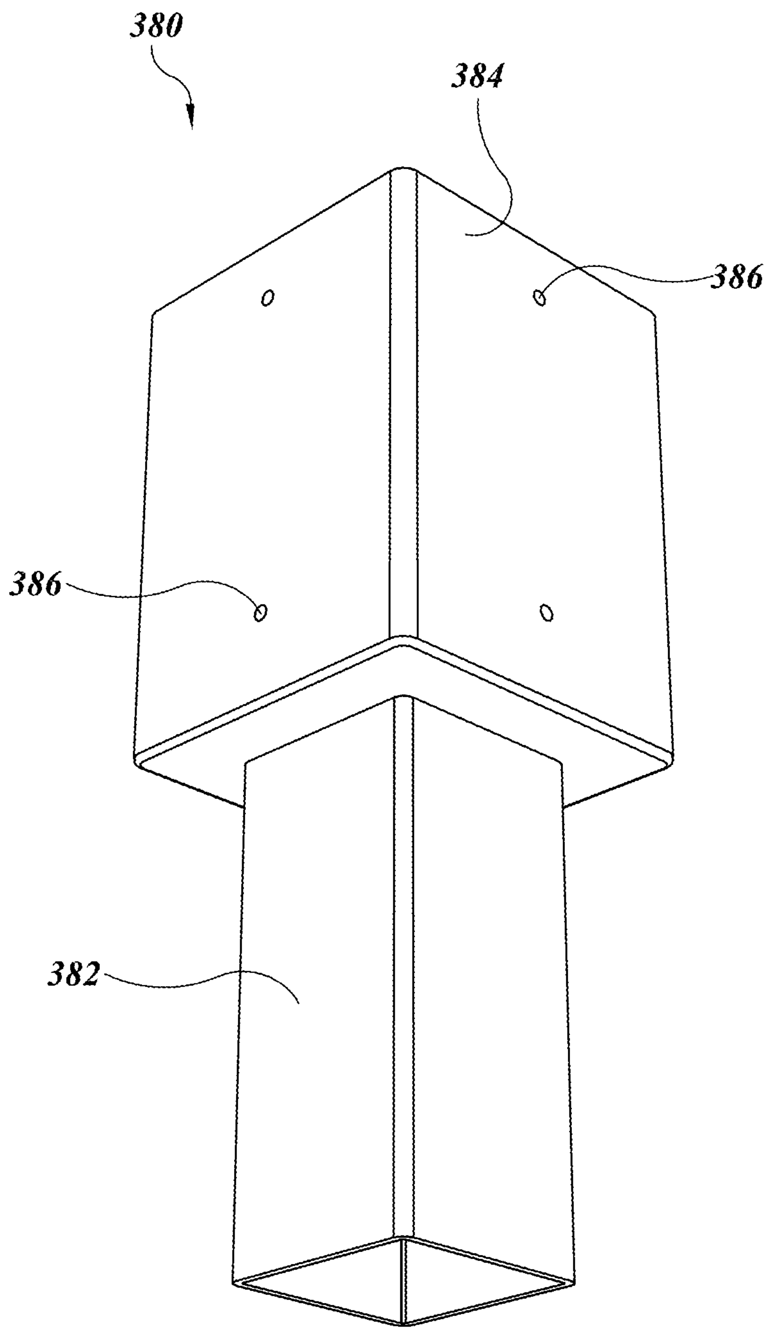
FIG. 17 shows an oversized post support according to an embodiment.

FIG. 17 shows an oversized post support 380 having a sleeve engagement element 382 configured to be positioned within a post sleeve. A post engagement element 384 of the post support 380 is configured to receive an oversized post having a size that is too large for the post sleeve. Holes 386 are provided for screws to permit secure attachment of a post to the post support. The sleeve engagement element 382 and post engagement element 384 of FIG. 18 are configured, respectively, to be received by a 4×4 post sleeve and to receive a 6×6 post, but this is only exemplary, and can be provided to meet a wide range of size requirements.

Figure 18:
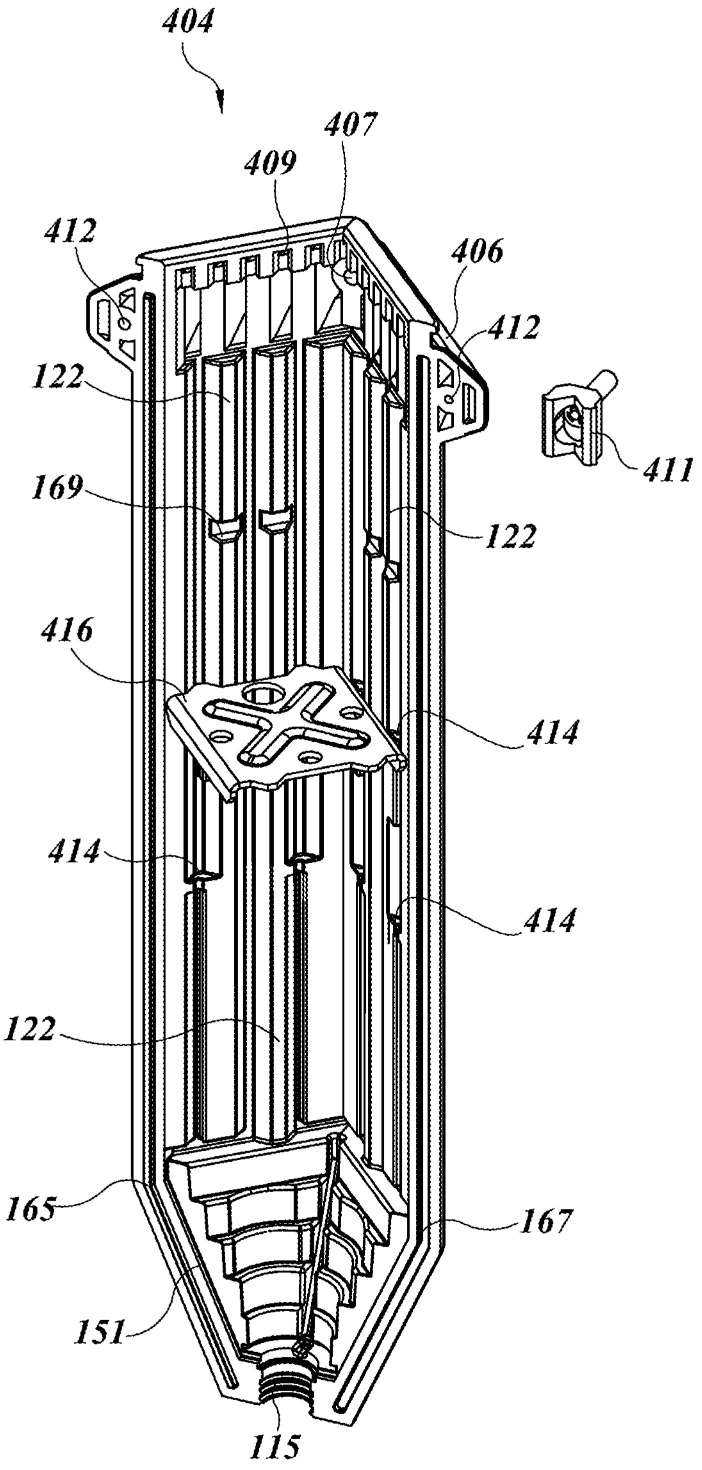
FIGS. 18 and 19 show a post sleeve according to an embodiment.
Figure 19:
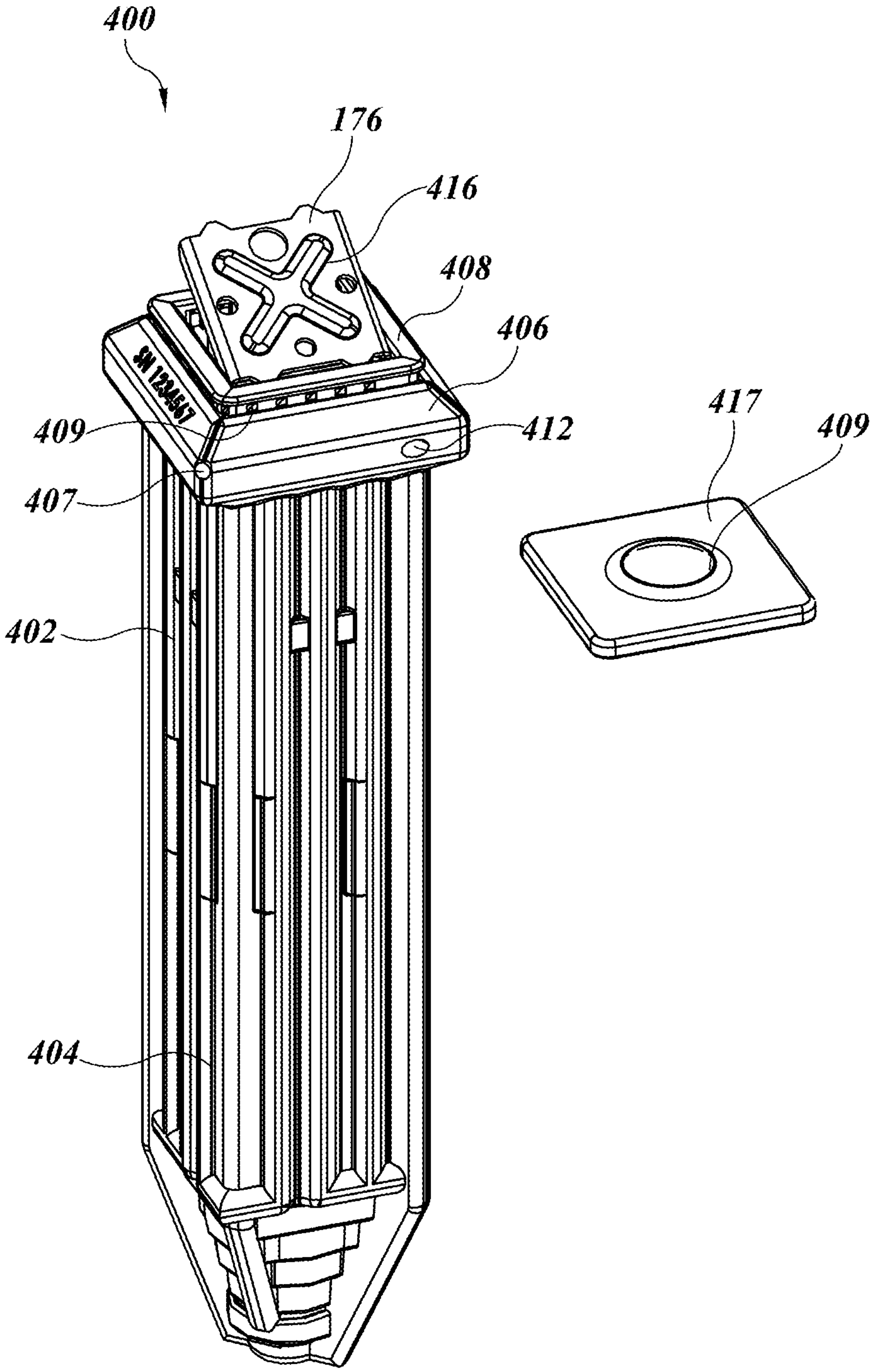

FIGS. 18 and 19 show a post sleeve 400 according to an embodiment in which the body 402 is formed of two identical sections 404. FIG. 18 shows a single section 404, while FIG. 19 shows the complete post sleeve 400 comprising two sections 404. The sections 404 are formed of an expanded plastic material and are manufactured by an injection molding process. The post sleeve 400 includes a rim 406 and post collar 408 formed integrally with the body 402 and defining an aperture 410 sized to fit closely around a post of a selected dimension—4×4 in the pictured embodiment. A cap 417 of a resilient material such as rubber is provided to fit over smaller sized posts and snap into place over the post collar 408 to prevent entry of water and debris into the post sleeve 400. In the example shown, the cap 417 has a round aperture 419 to fit over a 1⅞ inch round post. Apertures 409 under the post collar 408 permit ventilation, while the post collar 408 directs water onto the outwardly sloping rim 406. An aperture 407 is provided to receive a fastener 411 configured to engage and lock a post positioned in the sleeve, similar to the fastener described with reference to FIG. 4.

Stops 414 are provided at various depths within the post sleeve 400 for engagement by plates 416. Each plate 416 is provided with tabs 176 positioned on two opposing edges of the plate so as to engage opposing stops 414 and bridge across the interior of the post sleeve 400. In the transverse dimension the plates 416 are narrower so as to fit through the aperture 410 and between the standoff ribs 122 at an angle, as shown in FIG. 19, to enable positioning and removal of the plates 416. A plate 416 can engage stops 414 at any height by lowering the plate 416 into the post sleeve 400 at an angle and engaging the stops at a selected depth, first on one side, then allowing the plate to drop and engage the stops on the opposite side of the sleeve.

According to an embodiment, stops 414 on one face of each section 404 are positioned some distance above the stops on the adjacent face. When the sections are assembled together, the stops 414 directly opposite each other are at the same depth, while those on the transverse faces are at a different depth. Thus, the plate 416 can be positioned at any of a number of different depths by selecting the orientation of the plate as it is introduced into the sleeve, then selecting the set of stops to engage on a given pair of opposing faces.

The sections 404 are joined as described with reference to the sleeve sections 118 of FIG. 7, and also include apertures 412 configured to receive screws for secure coupling of the sections 404. The post sleeve 400 is configured to be set directly in a concrete footing without a separate concrete body, and is provided with thicker sidewalls than those of the liner 120 described in previous embodiments, which provide sufficient stiffness to resist the weight of wet concrete and prevent deformation of the body 402 during the pour of the footing. The post sleeve 400 provides, in a one-piece construction, many of the advantages described above with reference to other embodiments.

Figure 20:
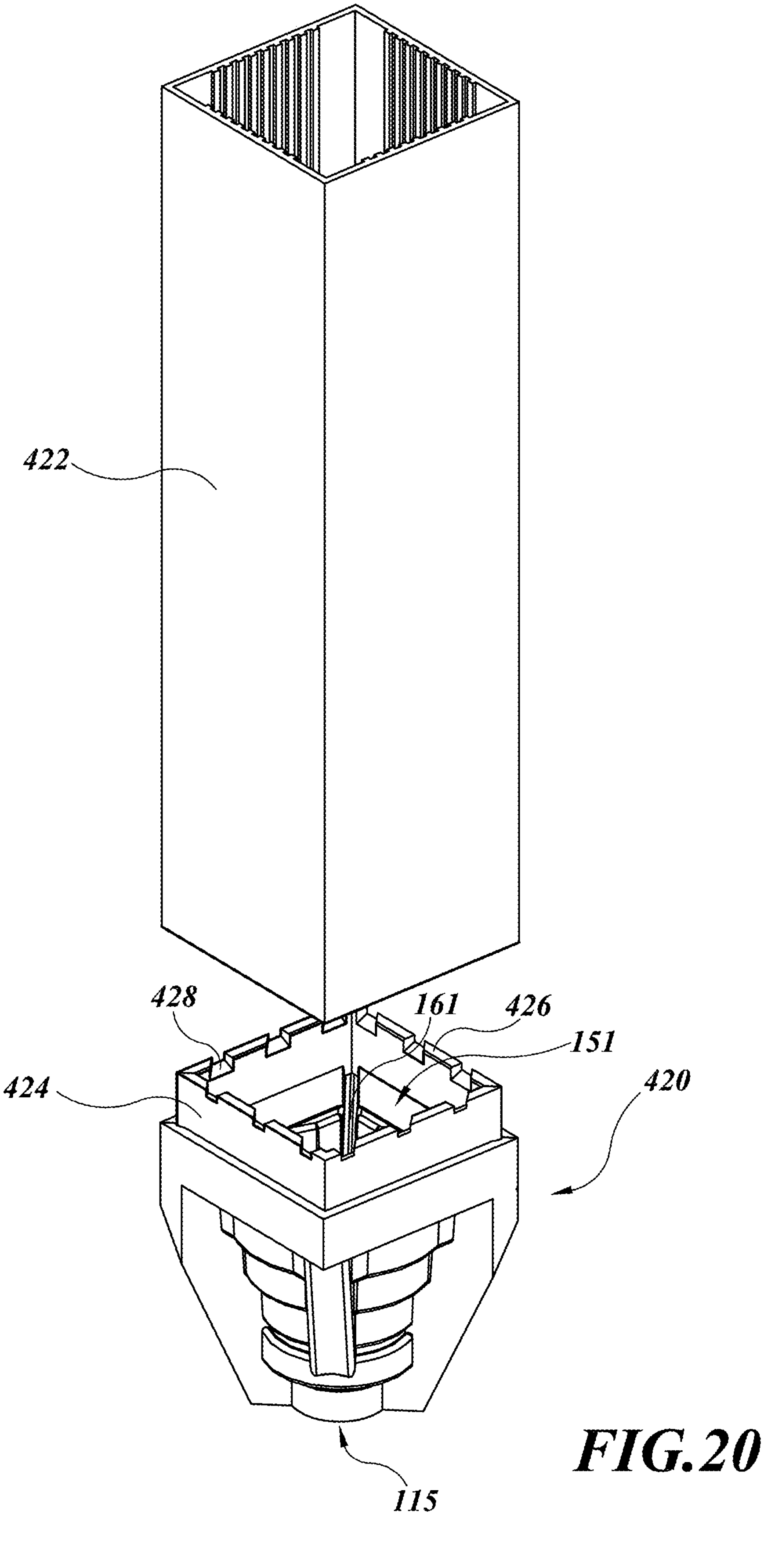
FIG. 20 shows an insert configured to engage a commercially available post sleeve section.

FIG. 20 shows an insert 420 that is configured to engage a commercially available post sleeve section 422. There are a number of post sleeves that are commercially available that provide some protection to posts set in concrete, such as, for example, the plastic sleeve 422 shown in FIG. 20. The sleeve 422, manufactured by PostShield USA™, is sized to receive a 4×4 post. It is manufactured using an extrusion process and is therefore very low in cost, but because of that process, is limited to a single continuous profile.

The insert 420 includes an engagement element 424 having outer dimensions that correspond to the size of a 4×4 post, and therefore fits into the lower end of the sleeve 422. The engagement element 424 includes a substantially planar top surface 426 with a plurality of notches 428. The insert 420 is provided with an aperture 115 to permit water to drain via a drain hose, etc., while preventing direct contact of the post with concrete or the underlying soil. Additionally, a universal socket section 151 is provided, similar to that described with reference FIG. 4, which enables a user to convert the commercial post sleeve 422 for use in other configurations. The insert 420 is formed of an expanded plastic such as that described with reference to the embodiment of FIG. 19, and can be manufactured in a single piece or two identical halves.

A user positions the insert 420 in the lower end of the post sleeve section 422 and fixes the combined assembly in the ground according to the requirements of the particular application. Typically, the engagement element 424 engages the sleeve section 422 with an interference fit that is sufficient to hold the assembly together until it is emplaced, especially if it is to be fixed in a concrete footing. However, if necessary, the insert 420 can be fixed to the sleeve through the use of commercial adhesives, tape, or screws. When a post is positioned in the sleeve section 422, the bottom end of the post rests on the top surface 426, if it is a 4×4 post, or in the appropriate one of the sockets of the universal socket section 151, according to its dimensions. As with the post sleeves of other embodiments, water that enters the sleeve 422 is permitted to drain from the assembly, via the notches 428, gutters 161 of the universal socket section 151, and the aperture 115.

Figure 22A:
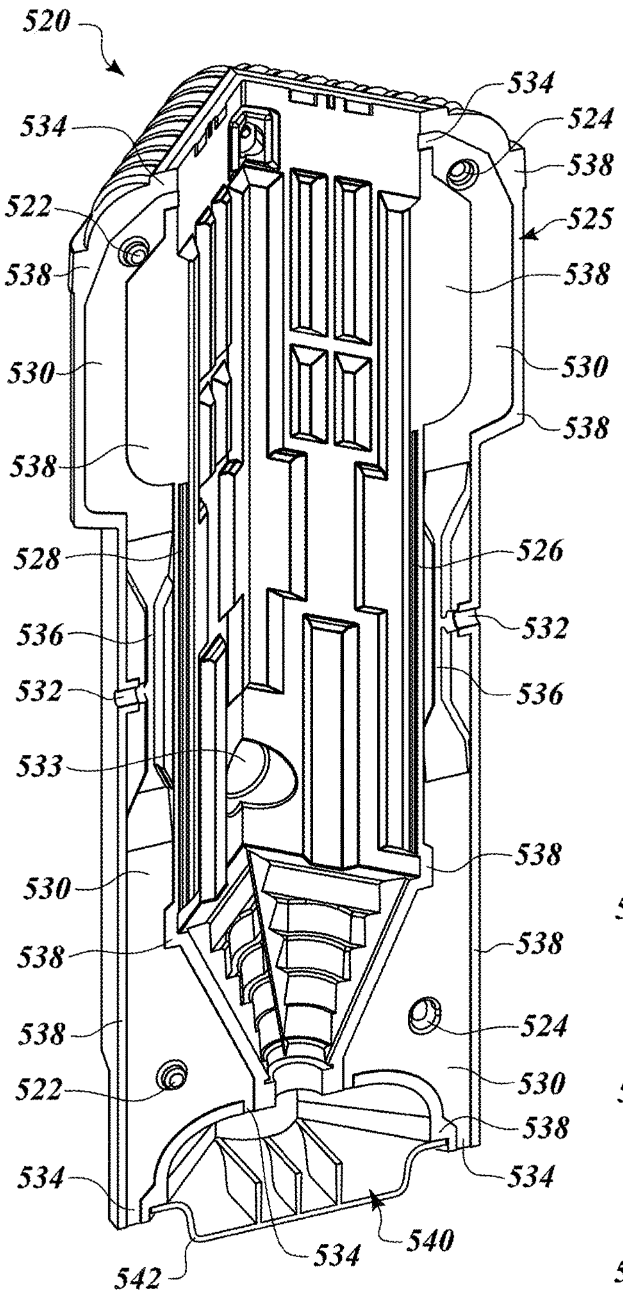
FIG. 22A shows a concrete half sleeve according to an embodiment.
Figure 22B:
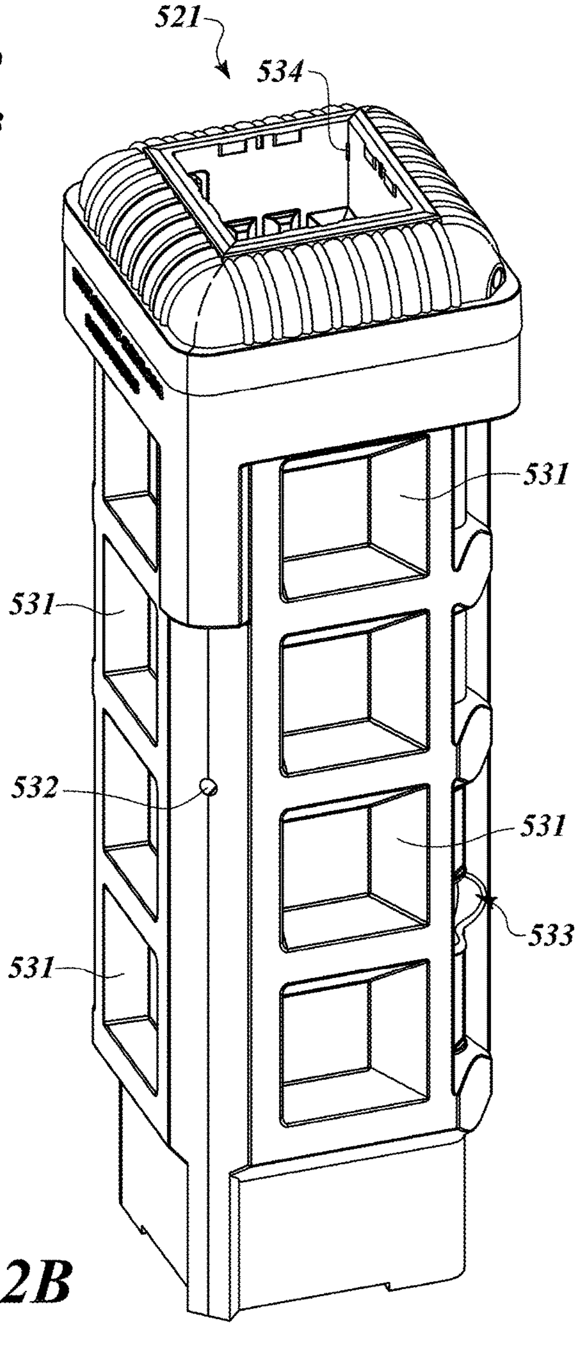
FIG. 22B shows a complete post sleeve formed from two of the half sleeves of FIG. 22A.

FIG. 22A shows a concrete half sleeve 520, according to an embodiment. The half sleeve 520 has a joining face 525 that includes alignment pins 522 and alignment apertures 524, a tongue 526, and a groove 528. When two half sleeves 522 are positioned face-to-face to form a complete post sleeve 521, as shown in FIG. 22B, the alignment pins 522 and alignment apertures 524, and the tongue 526 and groove 528 mate together and ensure correct positioning of the half sleeves. The joining faces 525 of each half sleeve 520 make contact, and define a central, longitudinal plane of the post sleeve. Additionally, the half sleeve 520 includes adhesive networks 527 comprising channels 530, inlet ports 532, and outlet ports 534. The channels 530 are defined by lands 538, and include distribution manifold sections 536.

To assemble a post sleeve, a user first positions the joining faces 525 of two half sleeves 520 together so that the pins 522 of each mate with the apertures 524 of the other, thereby correctly aligning the halves. The halves are then bound together by appropriate means, such as, for example, straps or wire around the outside. In some cases gravity is sufficient to hold the halves together during the bonding process. When the two half sleeves 520 are mated together, the lands 538 of both halves contact each other to enclose the adhesive channels 530. The user then injects an appropriate grade of construction adhesive into the inlet ports 532. The adhesive flows into the inlet ports 532 and into the distribution manifold sections 536. From there, the adhesive flows into the remaining regions of the adhesive channels 530 and is distributed throughout the channels. Eventually, the adhesive begins to flow from the outlet ports 534, which is a positive indication that the adhesive channels 530 are completely filled. During injection, the highest pressure occurs in the distribution manifold sections 536. The tongue 526 and groove 528 are positioned opposite the manifold sections 536 to minimize leakage of the adhesive into the internal cavity of the complete post sleeve 521. When the adhesive has hardened, the half sleeves are permanently joined to form the complete sleeve 521. While completely filling the adhesive channels 530 with adhesive is not essential to permanently join the halves, the adhesive also acts as a seal to prevent moisture from entering the sleeve via the joint. The adhesive may be flexible for certain applications while rigid in others.

Although referred to in the specification as, e.g., inlet ports and outlet ports, etc., many of the features of the joining faces 525 are not complete until two half sleeves are placed face-to-face with each other. Thus, a complete inlet port is formed when an inlet port of one half sleeve is joined with an inlet port of another half sleeve. Accordingly, in the claims, such features of a half sleeve are referred to as sections, e.g., inlet port section. This is to distinguish the elements of the half sleeve from the elements formed when two half sleeves are mated.

Blind cavities 531 provide a strong mechanical engagement with a concrete footing when the complete sleeve 521 is installed in the ground. In cases where the installer does not use a poured-concrete footing, the cavities 531 provide a mechanical engagement with sand, crushed rock, or even dirt, to more firmly fix the sleeve into the ground.

The half sleeves 520 also include utility knockouts 533 that can be removed to provide access to the sleeve. For example, a user may employ a post sleeve to support a lamp post, or may wish to provide lights on a fence. In such cases, an electrical cable can be routed into the post sleeve 531 via the knockout 533. The knockouts comprise defined regions of the sleeve wall that are substantially thinner than the surrounding wall. With a mallet and chisel, the user strikes the knockout, breaking away the thinned portion.

According to an embodiment, the complete sleeve 521 is configured to be installed in a post hole by floating the sleeve in freshly poured concrete. Because the density of concrete varies, in part, according to the density of the aggregate used, it may, in some cases, be necessary to adjust the buoyancy of the post sleeve. Accordingly, rigid foam inserts can be placed in some of the cavities 531, which will displace corresponding volumes of concrete without adding appreciably to the weight, thus increasing the buoyancy of the sleeve 521. The half sleeve 520 is shown with a percolation chamber 540 that is defined, in part, by a degradable seal 542. While half of the seal 542 is shown in FIG. 22, in practice, a complete seal (as shown, for example, in FIG. 23A) is glued or snapped into place on the complete sleeve 521 after the half sleeves 520 have been joined. The seal 542 is configured to disintegrate after it comes in contact with water, and can be formed from any appropriate material, including cardboard, degradable plastics, etc. When the sleeve 521 is fixed in the ground in a footing, the seal 442 forms a cavity within the wet concrete. The first time water enters the sleeve 521, the seal deteriorates (after a delay, in order to prevent the form from failing when it first comes into contact with wet concrete), and, preferably, eventually dissolves completely, exposing the now-hardened surface of the concrete footing within the percolation chamber to the water. The concrete of the footing is selected to have a desired permeability to water, which allows water that is collected in the cavity to percolate through the footing and into the ground. The shape of the seal is exemplary, and can be modified according to a desired volume, to accommodate the amount of local precipitation and rate of percolation through the footing, or other factors that might affect the expected volume of water that will enter into and percolate from the cavity.

In one embodiment, the lowermost part of the sleeve is tapered or otherwise adapted to receive an extension, substantially increasing the effective length and surface area of the sleeve. This can be especially helpful for added infiltration area or lateral stability when using sand, gravel, or native dirt in place of poured concrete to encase the sleeve.

Figure 23A:
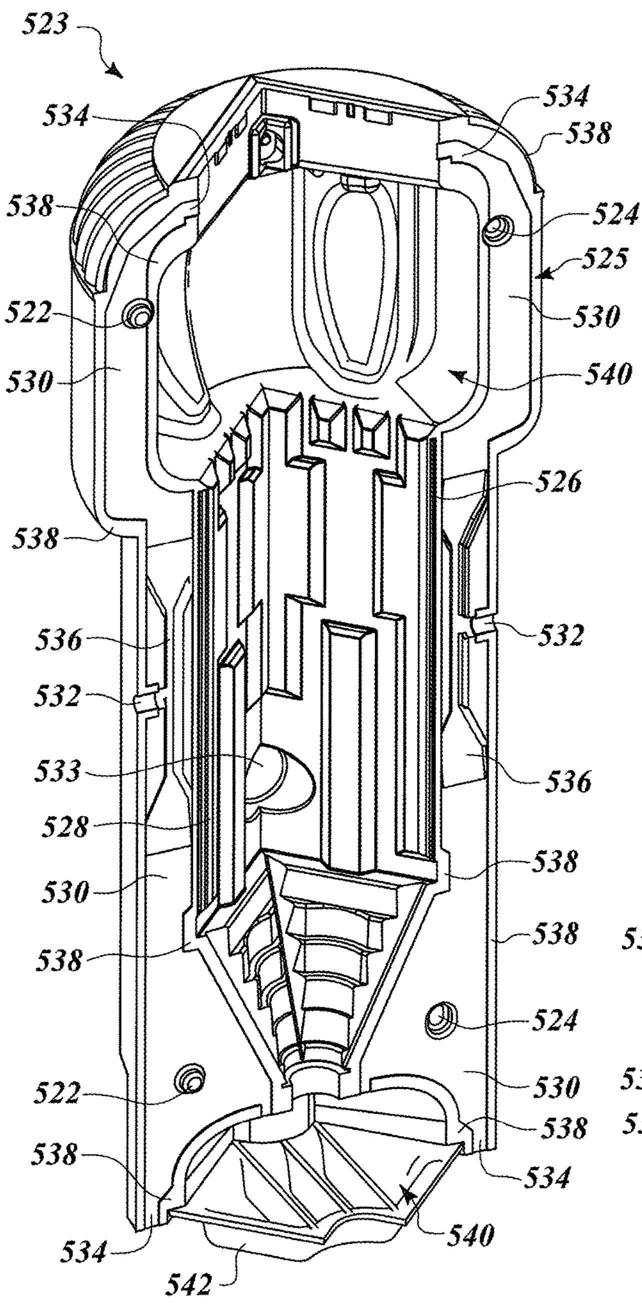
FIG. 23A shows a concrete half sleeve according to another embodiment.
Figure 23B:
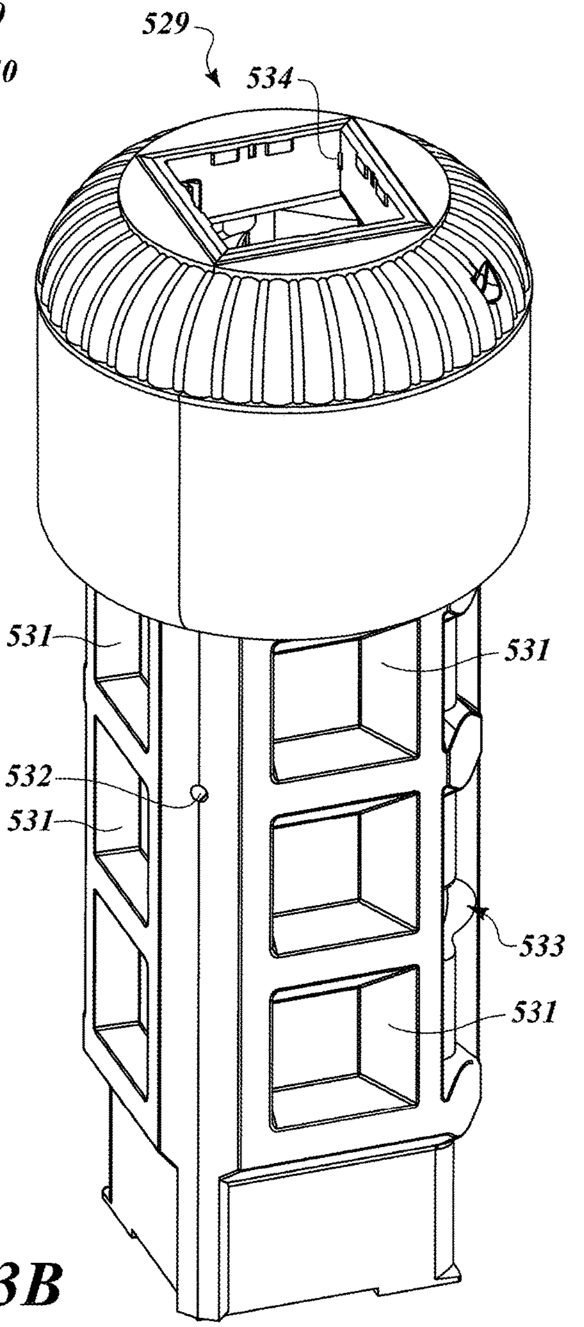
FIG. 23B shows a complete post sleeve formed from two of the half sleeves of FIG. 23A.

FIGS. 23A and 23B show a half sleeve 523 and complete sleeve 525, respectively, that are similar to the half sleeve 520 and complete sleeve 521 of FIGS. 22A and 22B, and that share many elements in common, which are indicated by identical reference numbers. Additionally, FIG. 23A shows a chamber 540 positioned in the upper portion of the half sleeve 523, configured to receive any of a number of inserts, which can be emplaced before two half sleeves are joined, to become part of the complete sleeve 525. For example, an annular foam insert can be provided that snugly receives a post, and that provides a degree of resilience to prevent or mitigate damage to the post or sleeve in the event the post is subjected to excessive lateral force. The chamber 540 also adds buoyancy to assist in installation. Additionally, temporary ballast can be placed in the bottom of the complete sleeve 525. With more buoyancy near the upper portion, the complete sleeve 525 will naturally tend to float in a more vertical position, simplifying the task of making the sleeve plumb.

Figure 24A:
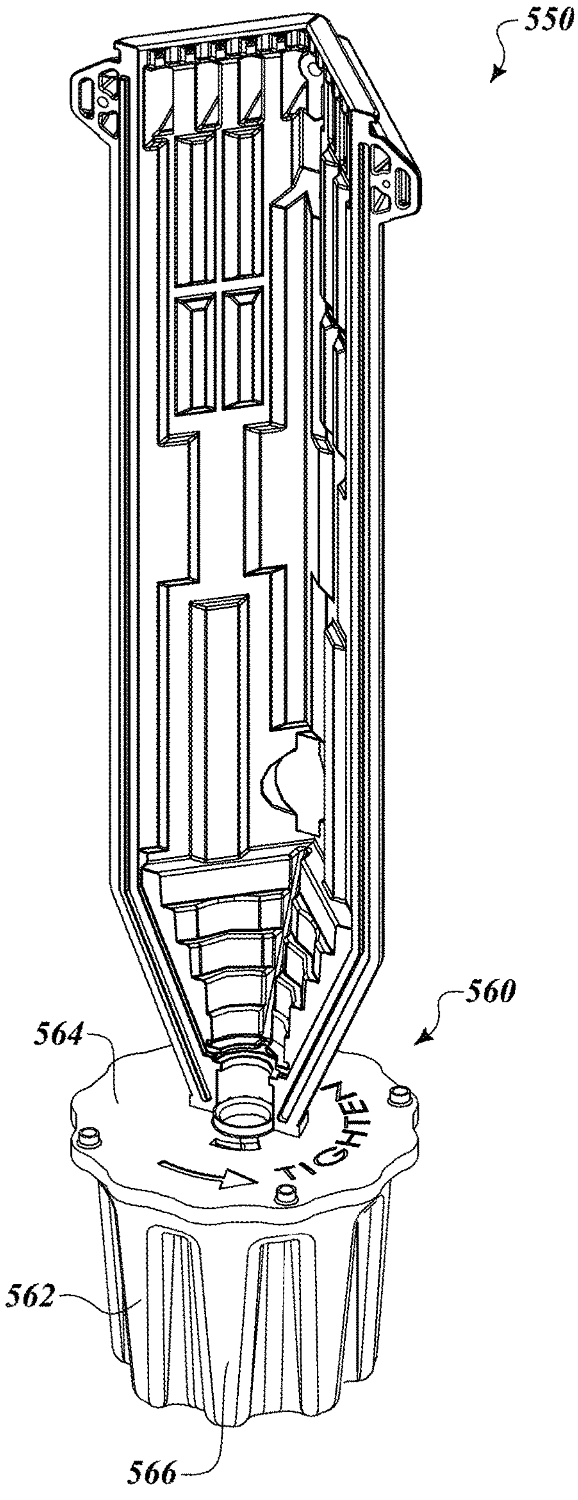
FIG. 24A shows a half sleeve and a chamber vessel according to another embodiment.

FIG. 24A shows a half sleeve 550 according to another embodiment. The half sleeve 550 is injection molded from structural foam. To form a complete sleeve, two half sleeves 550 are joined together as described with reference to other embodiments. FIG. 24A also shows a chamber vessel 560 that is configured to be attached to any post sleeve that includes a drain hole. The chamber vessel 560 includes a cup 562 and a lid 564. The cup is made from a degradable material, as described with reference to the seal 542 of FIG. 22A. The lid is made from a material having sufficient strength to withstand the forces applied during placement of a post sleeve to which it is attached in a concrete footing. The lid can be degradable, but this is not required. The cup 562 is configured to disintegrate in the same manner as the seal 542, and includes a plurality of convolutions 566 that serve to increase the surface area of a percolation cavity that is formed around it in the concrete footing, to improve percolation.

Figure 24B:
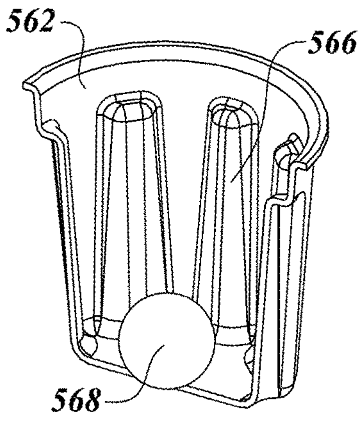
FIG. 24B shows a cutaway view of a portion of the chamber vessel of FIG. 24A.

FIG. 24B shows a cutaway of the cup 562 to show its interior. A ball 568 made from a resilient material, such as rubber or the like, is placed inside the cup 562 to provide frost protection. When installed in a concrete footing, the percolation chamber formed by the chamber vessel 560 is about two feet below the surface. In most climates, the ground does not freeze to that depth, even in the coldest weather. However, in the rare event that the frost line drops to below that depth, if there is water inside the percolation chamber, it could easily rupture the concrete footing when it freezes. The ball 568 reduces the likelihood of frost damage to the footing by creating a space into which the water can expand as it freezes. As ice forms in the chamber, the increased pressure of the expanding ice compresses the ball 568, instead of pushing outward to crack the footing. The amount of change in a volume of water, from liquid to solid, is very well known. The size of the ball is thus selected, according to the volume of the chamber vessel 560, to provide sufficient space for the expansion of the water in the chamber. In another embodiment but to a similar effect, the drain channels 124 can be lined with a cast in place cellular foam with memory, to allow for expansion as water freezes. Alternatively, products such as foam pipe insulation tube can be inserted alongside the smaller diameter posts for the same purpose.

Figure 29:
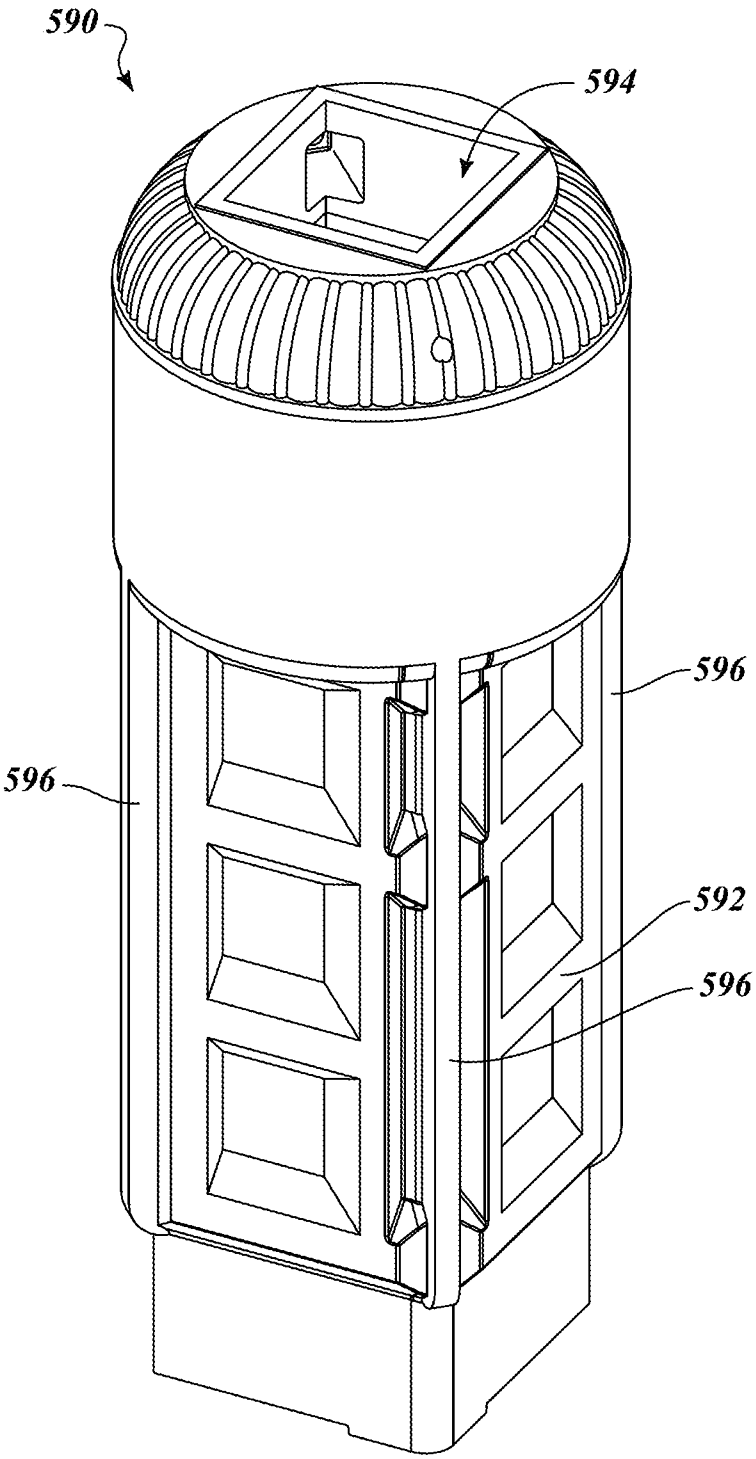
FIG. 29 shows a post sleeve according to another embodiment.

FIG. 29 shows a post sleeve 590 according to another embodiment. The post sleeve 590 is similar in many respects to sleeves described previously, and includes a body 592 with a post aperture 594 configured to receive and support a post therein. The post sleeve 590 also includes fins 596 that extend parallel to a longitudinal axis of the sleeve, on the exterior of the body 592. The fins 596 provide increased vertical surface area, and therefore increased resistance to movement under lateral loads. In applications where a post sleeve is to be installed in the native soil without a concrete footing, the fins 596 of the post sleeve 590 provide additional stability. This kind of installation involves positioning the post sleeve 590 in a post hole, then filling the remainder of the hole with compaction material such as, e.g., sand, pea gravel, or a portion of the soil removed to create the hole. The material is then compacted, with water, in the case of sand or gravel, or by tamping, and if desired, the top of the hole around the sleeve is covered with sod or the like.

Figure 25:
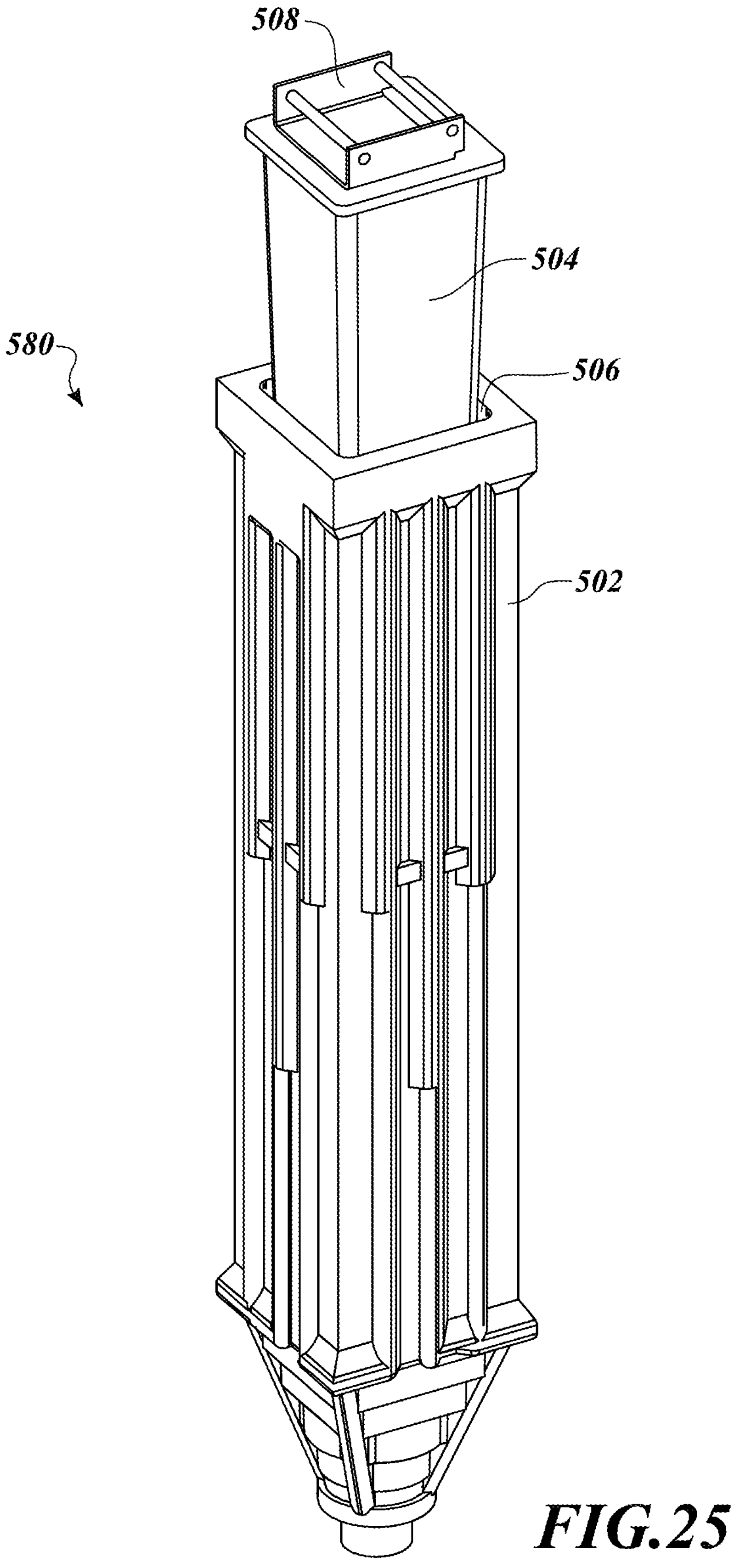
FIG. 25 shows a sleeve core according to one embodiment.

Turning now to FIG. 25, a sleeve core 500 is shown, according to an embodiment. The core 500 includes an outer shell 502 made from a flexible elastomeric material such as silicone, synthetic rubber, or the like, that has the shape of the inside of a post sleeve. A stiffener 504 fits into a cavity 506 in the outer shell 502. An attachment bracket 508 can be provided to attach the sleeve core 500 to a positioning device.

The sleeve core 500 is placed in wet concrete in a location where a post sleeve is required, and the concrete is allowed to set around it. Once the concrete is adequately hardened, the stiffener 504 is removed from the outer shell 502. Without the stiffener, the shell 502 is sufficiently flexible that it can be removed from the concrete, leaving a cast-in-place post sleeve. Similarly, where a sleeve liner lacks sufficient rigidity to withstand the lateral pressure of wet concrete without deforming, a stiffener can be used to support the liner until the concrete sets, whether in a factory or in the field, with the liner being set in concrete on site.

Figure 26:
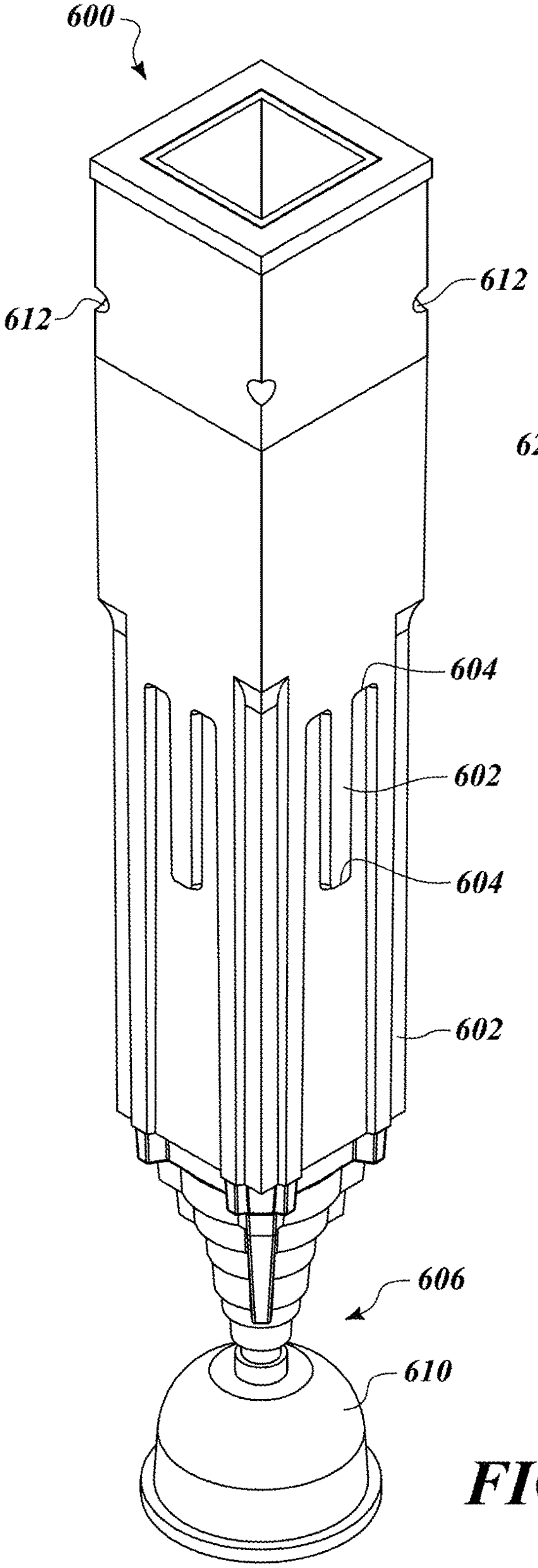
FIG. 26 shows a post sleeve core according to another embodiment.

FIG. 26 shows a post sleeve core 600 according to another embodiment. The sleeve core 600 is made of a rigid material such as steel, aluminum, or plastic, with a pattern draft to allow the core to be pulled from the sleeve after the sleeve is cast in a single piece around the core, either on site, or in a factory. The core 600 includes rib features 602 for forming standoff ribs, stop features 604 for forming plate stops, and socket features 606 for forming a universal socket. Of course, in practice, the specific features and dimensions of the core 600 are selected according to the requirements of a particular application. notches 612 are provided, for engagement by a fastener, as described below with reference to FIG. 26.

A drainage chamber form 610 is also shown, coupled to the sleeve core 600. In the embodiment pictured, the chamber form 610 is configured to slip onto the bottom-most feature of the sleeve core 600. When the sleeve core 600 and chamber form 610 are used to form a post sleeve in the ground, the chamber form remains at the bottom of the post sleeve after the sleeve core is removed. A drainage aperture is formed where the drainage chamber is coupled to the sleeve core. The chamber form 610 can be sized to fit over any of the socket features 606 of the sleeve core 600, although it will be recognized that if the chamber form is coupled to one of the upper features, the features below will be inside the chamber form when concrete is poured around the sleeve core, so corresponding elements of the universal socket will not be formed in the resulting post sleeve.

The chamber form 610 can be made from a material that will degrade or dissolve when exposed to water, or can be of a substantially non-degradable material such as metal or plastic. Additionally, a degradable closure, like the barrier 328 described with reference to FIG. 14, can be used to prevent concrete from flowing up into the chamber form 610 during formation of a post sleeve. Such a closure is not required when the chamber form 610 is positioned directly on the soil at the bottom of the post hole, or on drainage gravel in the hole. As previously explained, it is not essential that a purpose-made drainage chamber form be used. Other readily available products can also be used, including, for example, sections of plastic pipe, cardboard tube, steel or concrete drain pipe, and even sections of plastic beverage bottles—although where relatively thin-walled or non-rigid products are used, they should be filled with sand or gravel, or otherwise reinforced, to prevent being collapsed by the weight of the concrete during formation. It is only necessary that the connection between the chamber form 610 and the sleeve core 600 be sufficiently tight to prevent substantial amounts of concrete from flowing into the chamber form during formation of the sleeve, and sufficiently loose to permit separation from the sleeve core 600 after the concrete is cured.

Normally, a commercially available release agent is used to prevent wet concrete from adhering to the core 600, and to act as a lubricant to permit removal of the core once the concrete is cured. Alternatively, a wax coating can be used on the sleeve core 600 as a release agent, and also as a waterproofing agent within the sleeve that is formed thereby.

Depending on the thickness and formulation of the release agent, there may not be a need for any draft to the core. For example, it is known that various petroleum-based waxes can be formulated to have selected thixotropic characteristics, so that, at rest, they will have a given viscosity, but under stress, will undergo shear thinning. The sleeve core 600 can be coated with such a material, which forms a layer of a selected thickness between the sleeve core and the concrete. After the concrete is cured, a pulling force is applied to the sleeve core 600 to draw it from the post sleeve. In response to the force applied, the coating transitions to a liquid or semi-liquid phase, allowing the core to slide easily from the post sleeve, even though the sides of the sleeve core are perfectly parallel. Alternatively, simply by coating the core to a sufficient thickness with a substance that will harden—e.g., wax—to prevent displacement by the wet concrete, a sufficient gap can be established between the concrete and the sleeve core for later removal of the core.

On the other hand, under some circumstances, a draft may be beneficial. For example, given a post sleeve configured to support a 3½ inch square post at a depth of 19 inches, and a draft of 1°, the dimensions of the sleeve will be about % inch smaller at the bottom of the sleeve than at the top. If the spacing between the standoff ribs is 3⅞ inches at the top, to allow for a slightly loose fit as a post is inserted, a true 3½ inch post will make full contact with the ribs a little more than half-way down, and will require some force to drive the post to the bottom of the sleeve. At the bottom, the standoff ribs will press into the sides of the post about ⅛ inch on each side, thereby holding the post firmly in place, while still allowing some flexing of the post at the top.

It is well known that concrete continues to cure and harden for many years after being poured. Thus, the term cure, when used with reference to poured concrete, can be relative. For the purposes of the specification and claims, cure, and related terms, are to be construed as meaning sufficiently cure. Accordingly, where a claim recites, e.g., "removing the post sleeve core from the cured concrete," the "cured concrete" is concrete that is cured sufficiently for removal of the core.

Figure 27:
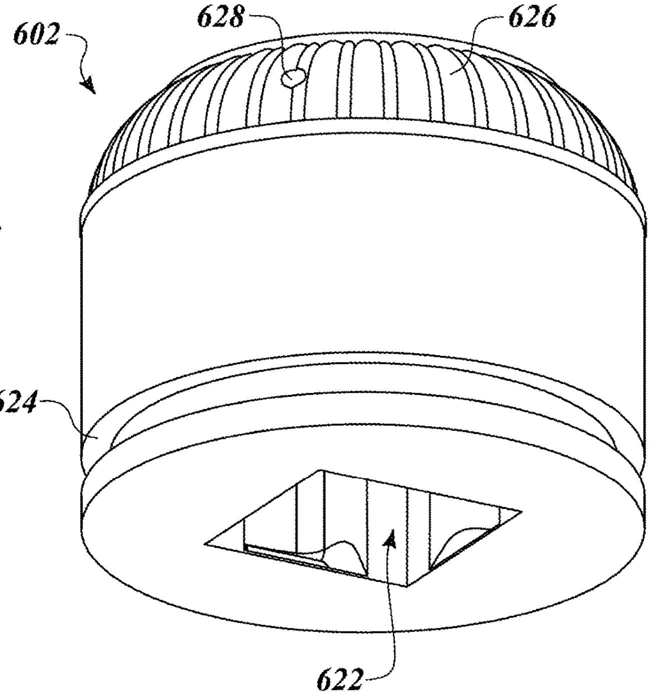
FIG. 27 shows a sleeve top for use with a sleeve core such as, for example, one of the sleeve cores of FIGS. 25 and 26.

FIG. 27 shows a sleeve top 620 configured for use with a sleeve core such as, for example, the sleeve core 600 of FIG. 25. The sleeve top 620 is preferably made from high strength concrete, and includes a post aperture 622 extending axially through the sleeve top and configured to receive a post, and a decorative upper surface 626. The sleeve top 620 of FIG. 27 includes one or more grooves 624 1 configured to be engaged by concrete used to form a post sleeve. Other embodiments of the sleeve top can be provided with other features for engagement by fresh concrete, including, for example, cross-hatched grooves, protruding knobs, pieces of reinforcement bar, etc. Also visible in FIG. 27 is a sleeve aperture 628, provided for access to a fastener located inside the sleeve top, and configured to operate in a manner similar to the fastener 142 described with reference to FIG. 4. Additionally or alternatively, a temporary fastener can be positioned in the apertures 628, configured to engage the notches 612 of the sleeve core 600, for use during formation of the post sleeve. The embodiment shown includes a chamber 630 (see FIG. 28) similar to the chamber 540 described with reference to FIGS. 23A and 23B.

According to various embodiments, the sleeve top 620 can include any of the elements described with reference to previous embodiments, at least insofar as they relate to the corresponding upper portion of the respective post sleeve. For example, a unique identifier can be provided on an outer surface of the sleeve top 620, or as an encapsulated RFID unit. The sleeve top 620 is intended primarily for use with a post sleeve made from concrete that is poured on site, though there is no reason it cannot also be used as part of a factory-made post sleeve.

Figure 28:
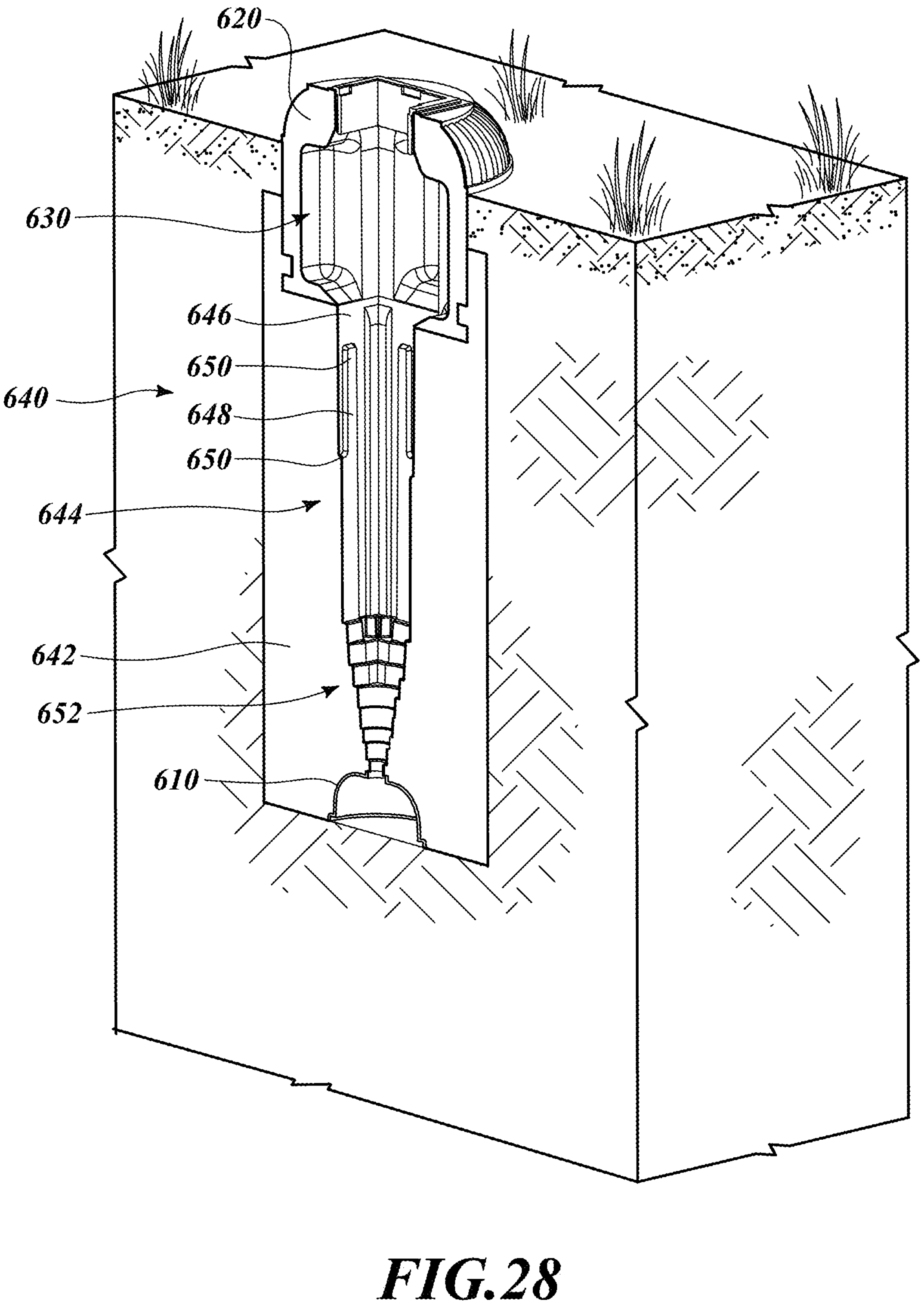
FIG. 28 shows a sectional view of a post sleeve made with the sleeve core of FIG. 26 and including the sleeve top of FIG. 27.

Turning now to FIG. 28, a sectional view of a post sleeve 640 is shown, made with the sleeve core 600 of FIG. 26 and including the sleeve top 620 of FIG. 27. A main body 642 of the post sleeve 640 is formed from concrete that is poured on-site, and includes an inner volume 644 defined by sidewalls 646, stand-off ribs 648, plate stops 650, and a universal socket 652, all as defined by the shape of the post core 600. The post sleeve 640 is buried in the ground, with an upper portion of the sleeve top 620 exposed above-ground.

To make the post sleeve 640, a user digs a post hole 654, and, if desired, places gravel in the bottom of the hole for drainage. A release agent is applied to the sleeve core 600, which is then positioned in the aperture 626 of the post top 620. A fastener in the aperture 628 of the post top 620 engages the notch 612 of the sleeve core 600, locking them together. The drainage chamber form 610 is coupled to the bottom of the sleeve core 600 by friction fit. The assembly comprising the core 600, the sleeve top 620, and the chamber form 610 is then positioned in the post hole 650. The assembly can be suspended in the hole 654, or can be positioned to rest on the bottom. In the embodiment of FIG. 28, the assembly would have been positioned to rest on the bottom, with the open part of the chamber 610 in contact with the soil at the bottom of the hole 654. With the assembly held in the desired position, concrete is poured around the sleeve core 600 to fill the hole to a level a few inches below the surrounding grade. The concrete fills the groove 624, firmly locking the sleeve top 620 into the freshly-poured concrete sleeve 642.

The position, elevation, and orientation of the assembly is confirmed while the concrete in the hole 654 is still loose, to ensure that they are within tolerances, and the assembly is held in position. Preferably, a vibrator is used to settle the concrete and remove entrained air, and the concrete is allowed to cure. The fasteners in the apertures 628 are then loosened or removed, and the sleeve core 600 is drawn out through the aperture 622 of the sleeve top 620, leaving the inner volume 644 of the post sleeve 640 behind, ready to receive a post. After the sleeve core 600 is removed, soil or sod is placed over the main body 642 to the edge of the sleeve top 620, leaving only the decorative upper surface 626 visible. When a post is positioned in the post sleeve 640, the post passes entirely through the sleeve top portion, and is seated in the portion formed by the post sleeve core 600. Elements described with reference to other embodiments, such as, e.g., stop plates, collars, etc., can also be used with the post sleeve 640.

The sleeve core 600 is shown as having notches 612 for engagement by fasteners of the sleeve top 620. Thus, in the embodiment shown, the distance from the top of the post sleeve 640 to the various features within the inner volume are known, as in other embodiments. Alternatively, the sleeve core 600 can be provided with a number of notches

612 spaced vertically for two or three inches along each corner, so that the depth of the post sleeve 640, relative to the sleeve top 620, can be selected when the sleeve is formed, by engaging different ones of the notches according to the desired depth. As a further alternative, the notches can be entirely omitted, and the fastener configured to engage the sleeve core 600 by friction engagement only. This permits a wider range of adjustment for depth selection—it will be recognized that where notches are provided, the maximum depth is limited by the position of the bottom-most notches, which must always be positioned inside the sleeve top so that concrete does not engage the notches and interfere with removal of the core from the sleeve.

The embodiment of FIGS. 26-28 provide the benefits of the factory-made sleeve tops, including the hardened concrete and the ability to efficiently form a wide range of shapes and configurations, with a reduced size and weight, which reduces freight and handling costs. Additionally, a number of different sleeve sizes and configurations can be provided, by using various sleeve cores, while conforming to standard dimensions for the sleeve tops. This reduces inventory and warehousing requirements for preformed elements without reducing the available configurations. Finally, the main body can be placed in a smaller post hole, thereby reducing the overall consumption of materials.

A number of systems and methods for positioning and supporting post sleeves in post holes are disclosed in the co-pending U.S. patent application Ser. No. 12/403,985, filed Mar. 13, 2009, and incorporated herein by reference, in its entirety.

In addition to the advantages outlined above, a number of advantages are afforded in accordance with various embodiments. For example, post sleeves permit the temporary removal and replacement of posts. It is not uncommon for an individual to find it necessary to remove a section of a fence in order to move a vehicle or temporarily permit access to a normally enclosed area. Under such circumstances, where previously it might have been necessary to dig up two or three posts with their concrete footing, a user can simply pull the posts out of the sleeves and re-install them later.

Because of the protection from water damage provided by the post sleeves, the serviceable lifespan of wood posts is extended. Additionally, lower grades of wood, or more cheaply and environmentally friendly finished wood can be used without sacrificing durability.

Because of the stops and stop plates, shorter posts can be substituted for longer ones with no loss of structural strength. At the lumber mills, the shorter the length of the posts being cut the greater the yield from a given trunk, and the more economical. For example, due to the tapered shape of the trees from which most lumber is produced, there are increased efficiencies obtained if shorter lengths of material are cut therefrom. While eight-foot lengths are the most commonly used, mills inevitably produce shorter lengths, as well, either as leftover sections after a length has been cut into eight-foot pieces, or because, when setting out to produce eight-foot posts, many of the pieces generated will need to be trimmed back due to end defects. Thus, mills generally have a surplus of lumber shorter than eight feet in length, because standard methods of construction require the eight-foot lengths, making the shorter timbers less marketable. By employing post sleeves to anchor the fence posts, seven-foot lengths can be used, which, because of their availability and recovery, are less expensive per linear foot than eight-foot lengths and are more environmentally friendly. Furthermore, even if demand for seven-foot lengths of fence posts increases beyond the surplus currently available, the price will inherently remain lower because of the better yield of shorter posts from a given length of tree, as explained above. Due to the improved economy with respect to both yield and trim backs, mills can sell 7 foot material for substantially less per linear foot, and produce it in a more environmentally friendly way, than the 8 foot material.

Many of the advantages outlined above contribute to a significant reduction in overall environmental impact: the ability to use shorter posts for a given size means a higher yield per trunk and less scrap, which in turn means that fewer trunks need be cut to produce a given number of posts; the increased useful service life of a post means fewer replacement posts need be provided, further reducing consumption; protection of the post from water and most insects means that pressure treatment is no longer necessary, which reduces chemical pollution and also enables composting or recycling of the used posts, and which also potentially reduces the load on solid waste landfills currently necessary to dispose of pressure treated lumber; the permanent, long lasting post sleeve eliminates the need to dig up and dispose of old concrete footings, and the need to replace the concrete footing with new concrete; which means a long-term reduction in high energy consumption required to produce the cement of the replacement concrete; the compatibility of the post sleeve with a wide range of post configurations means that a change in function that requires a change in post height or size does not necessarily require a replacement of the concrete footing; and the tracking of application data associated with the unique identifiers means that large fence sections can be manufactured to order in a shop or factory rather than on site, which results in fewer lifetime site visits, less overall fuel consumption, and less material waste, which further reduces the consumption of raw materials.

Embodiments of the invention are directed to sleeves configured to support posts, e.g., fence posts, sign posts, etc. Accordingly, many of the elements are described and claimed with reference to a post. For example, in describing the standoff ribs 122 of FIG. 2, the post sleeve 102 is described above as functioning "as an extension of the post." Nevertheless, unless a claim positively recites a post as an element of the claim, reference in a claim to a post is to be construed only as defining the recited element as it relates to a post, and is not to be construed as requiring the post. Therefore, if such a claim reads on a given device with a post, it will also read on the device in the absence of the post.

When used in the specification or claims to refer to a post sleeve assembly or elements thereof, terms that refer to a relative vertical position, such as upper, lower, above, below, top, bottom, etc., are to be construed according to the normal orientation of the referenced element in use, i.e., with an associated post sleeve oriented to support a post vertically—see, for example, the post sleeve assembly 100 of FIG. 3. Terms such as inside, outside, inner, and outer are used with reference to an element's position relative to a central axis of an associated post sleeve. Terms that refer to an element's relative horizontal position, such as right and left, are used for convenience and clarity in the description, and do not limit the scope of the claims. The term longitudinal refers to an aspect of an element along or parallel to what would be the central axis of a post positioned in the associated post sleeve. For example, the longitudinal dimension of the post sleeve 102 is the dimension from the top to the bottom of the post sleeve, as viewed in the figure. Transverse refers to an aspect of an element along an axis or in a plane that is at least approximately perpendicular to the longitudinal axis.

Ordinal numbers, e.g., first, second, third, etc., are used in the claims merely for the purpose of clearly distinguishing between claimed elements or features thereof. The use of such numbers does not suggest any other relationship, e.g., order of operation or relative position of such elements. Furthermore, ordinal numbers used in the claims have no specific correspondence to such numbers used in the specification to refer to elements of disclosed embodiments on which those claims may read.

As used in the specification and claims, the term post sleeve refers to a structure that is configured to removably receive a post, to hold the post in a substantially fixed and upright position, and, after the post is removed, to removably receive a replacement post.

The term preformed is used to refer to an element that is formed or manufactured at one location, then moved to another location for use.

Where a claim limitation recites a structure as an object of the limitation, that structure itself is not an element of the claim, but is a modifier of the subject. For example, in a limitation that recites "a joining face that, when the half sleeve and a substantially identical half sleeve are mated together, defines a central longitudinal plane of a resulting post sleeve," the substantially identical half sleeve is not an element of the claim, but instead serves to define the scope of the term joining face. Additionally, subsequent limitations or claims that recite or characterize additional elements relative to the substantially identical half sleeve do not render that structure an element of the respective claim, unless or until the structure is recited as the subject of the limitation.

The abstract of the present disclosure is provided as a brief outline of some of the principles of the invention according to one embodiment, and is not intended as a complete or definitive description of any embodiment thereof, nor should it be relied upon to define terms used in the specification or claims. The abstract does not limit the scope of the claims.

Individual elements of the various embodiments described above can be omitted or combined with elements of other embodiments to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of forming a post sleeve to receive and support a post in the ground, the method comprising:

digging a post hole in the ground;

positioning a post sleeve core in a post sleeve top, the post sleeve top including a body of a rigid material, the body including a post aperture extending axially completely through the body such that the post can extend completely through the body and extend beyond a lower end of the body, the post aperture forming a top portion of the post receiving cavity, and the body having an engagement feature near the lower end of the body;

positioning the post sleeve core and the post sleeve top in the post hole;

pouring a hardenable material into the post hole;

allowing the hardenable material to harden to form a hardened base surrounding the post sleeve core;

removing the post sleeve core from the hardened base through the post aperture, leaving a bottom portion of a post receiving cavity in the hardened base, the bottom portion of the post receiving cavity immediately adjacent to and continuous with the post aperture, the hardened base engaging with the engagement feature of the post sleeve top to rigidly lock the post sleeve top to the hardened base with the post aperture aligned with the bottom portion of the post receiving cavity.

2. The method of claim 1, further comprising placing gravel at the bottom of the post hole.

3. The method of claim 1, further comprising applying a release agent to the post sleeve core.

4. The method of claim 1 wherein positioning the post sleeve core and the post sleeve top in the post hole includes suspending the post sleeve core and the post sleeve top within the post hole.

5. The method of claim 1, further comprising positioning a post within the post sleeve.

6. The method of claim 1 wherein positioning the post sleeve core and the post sleeve top in the post hole occurs after pouring the hardenable material into the post hole.

7. A post sleeve formation system to assist in forming a post sleeve within a post hole in the ground, the post sleeve formation system comprising:

a post sleeve top including a body of a rigid material that forms an upper portion of the post sleeve, the body including a post aperture extending axially completely through the body such that a post can extend completely through the body and extend beyond a lower end of the body, the post aperture defining an upper portion of a post receiving cavity to receive and support the post; and a post sleeve core positioned within the post sleeve top, the post sleeve core having an exterior surface sized and shaped to define a lower portion of the post receiving cavity of the post sleeve when the post sleeve core is removed from a cured concrete base of the post sleeve.

8. The post sleeve formation system of claim 7, further comprising a chamber formed in the body, the chamber sized and positioned so that, when a post is positioned in the post sleeve, an open space is provided inside the body and surrounding the post.

9. The post sleeve formation system of claim 7 wherein, upon formation of the post sleeve, the post sleeve top and the cured concrete base collectively define a concrete footing with the post receiving cavity to receive the post.

* * * * *